(12) United States Patent
Takatsu et al.

(10) Patent No.: US 9,207,897 B2
(45) Date of Patent: Dec. 8, 2015

(54) INFORMATION PROCESSING SYSTEM, INFORMATION PROCESSING APPARATUS, AND DATA CONVERSION METHOD

(71) Applicants: Kazunori Takatsu, Kanagawa (JP); Naritake Kondoh, Kanagawa (JP)

(72) Inventors: Kazunori Takatsu, Kanagawa (JP); Naritake Kondoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 174 days.

(21) Appl. No.: 13/753,663

(22) Filed: Jan. 30, 2013

(65) Prior Publication Data
US 2013/0194633 A1     Aug. 1, 2013

(30) Foreign Application Priority Data

Feb. 1, 2012   (JP) .................... 2012-020250
Apr. 27, 2012  (JP) .................... 2012-101991
Jan. 10, 2013  (JP) .................... 2013-002199

(51) Int. Cl.
*G06F 3/12* (2006.01)

(52) U.S. Cl.
CPC ............ *G06F 3/1296* (2013.01); *G06F 3/1211* (2013.01); *G06F 3/1222* (2013.01); *G06F 3/1238* (2013.01); *G06F 3/1247* (2013.01); *G06F 3/1267* (2013.01); *G06F 3/1288* (2013.01)

(58) Field of Classification Search
CPC .................................................. G06F 3/1296
USPC .................................................. 358/1.1–1.16
See application file for complete search history.

(56) References Cited

U.S. PATENT DOCUMENTS

2002/0062453 A1*  5/2002  Koga ............................ 713/202
2007/0027990 A1   2/2007  Nakaoka et al.
2007/0127069 A1*  6/2007  Steele et al. ................. 358/1.16

FOREIGN PATENT DOCUMENTS

| JP | 2005-078252 | 3/2005 |
| JP | 2007-102675 | 4/2007 |
| JP | 4178823 | 11/2008 |

OTHER PUBLICATIONS

Extended European Search Report dated Apr. 8, 2014.

* cited by examiner

*Primary Examiner* — Benny Q Tieu
*Assistant Examiner* — Michael Y Tzeng
(74) *Attorney, Agent, or Firm* — IPUSA, PLLC

(57) ABSTRACT

An information processing system, which is implemented by one or more information processing apparatuses, includes an electronic data receiving unit configured to receive electronic data via a network from an external apparatus; and a data conversion unit configured to identify at least one of an output setting and a data format corresponding to attribute information of a user operating the external apparatus by referring to a storage unit storing at least one of the output setting and the data format in association with the attribute information of the user, and convert the received electronic data into output data according to at least one of the output setting and the data format.

19 Claims, 17 Drawing Sheets

(a) COMPANY TABLE

| COMPANY ID | COMPANY NAME | LOCATION | PRINTING CONDITION |
|---|---|---|---|
| 1234 | COMPANY A | JAPAN | DUPLEX, MONOCHROME |
| 1235 | COMPANY B | JAPAN | DUPLEX, FULL COLOR |
| 1236 | COMPANY C | USA | SINGLE-SIDE, FULL COLOR |
| 1237 | COMPANY D | JAPAN | SINGLE-SIDE, FULL COLOR |

(b) SECTION TABLE

| COMPANY ID | SECTION ID | SECTION NAME | LOCATION | PRINTING CONDITION |
|---|---|---|---|---|
| 1234 | 2222 | DEVELOPMENT | JAPAN | DUPLEX, MONOCHROME |
| 1234 | 2223 | SALES | JAPAN | DUPLEX, FULL COLOR |
| 1234 | 2224 | US BRANCH | USA | DUPLEX, MONOCHROME |
| 1235 | 2225 | GENERAL AFFAIRS | JAPAN | DUPLEX, FULL COLOR |
| 1236 | 2226 | HR | USA | SINGLE-SIDE, FULL COLOR |

(c) USER TABLE

| COMPANY ID | SECTION ID | USER ID | USER NAME | LOCATION | PRINTING CONDITION |
|---|---|---|---|---|---|
| 1234 | 2222 | 123 | USER A | JAPAN | DUPLEX, MONOCHROME |
| 1234 | 2223 | 124 | USER B | JAPAN | DUPLEX, FULL COLOR |
| 1234 | 2224 | 125 | USER C | USA | DUPLEX, MONOCHROME |
| 1236 | 2226 | 126 | XXXX | USA | DUPLEX, FULL COLOR |
| 1236 | 2226 | 127 | XXXX | USA | SINGLE-SIDE, FULL COLOR |

FIG.4

| COMPANY ID | COMPANY NAME | USER ID | USER NAME | PASSWORD |
|---:|---|---:|---|---:|
| 1234 | COMPANY A | 123 | USER A | 1234 |
| 1235 | COMPANY B | 124 | USER B | 1235 |
| 1236 | COMPANY C | 125 | USER C | 1236 |
| 1237 | COMPANY D | 126 | USER D | 1237 |
| 1238 | COMPANY E | 127 | USER E | 1238 |

FIG.5

(a) COMPANY TABLE

| COMPANY ID | COMPANY NAME | LOCATION | PRINTING CONDITION |
|---|---|---|---|
| 1234 | COMPANY A | JAPAN | DUPLEX, MONOCHROME |
| 1235 | COMPANY B | JAPAN | DUPLEX, FULL COLOR |
| 1236 | COMPANY C | USA | SINGLE-SIDE, FULL COLOR |
| 1237 | COMPANY D | JAPAN | SINGLE-SIDE, FULL COLOR |

(b) SECTION TABLE

| COMPANY ID | SECTION ID | SECTION NAME | LOCATION | PRINTING CONDITION |
|---|---|---|---|---|
| 1234 | 2222 | DEVELOPMENT | JAPAN | DUPLEX, MONOCHROME |
| 1234 | 2223 | SALES | JAPAN | DUPLEX, FULL COLOR |
| 1234 | 2224 | US BRANCH | USA | DUPLEX, MONOCHROME |
| 1235 | 2225 | GENERAL AFFAIRS | JAPAN | DUPLEX, FULL COLOR |
| 1236 | 2226 | HR | USA | SINGLE-SIDE, FULL COLOR |

(c) USER TABLE

| COMPANY ID | SECTION ID | USER ID | USER NAME | LOCATION | PRINTING CONDITION |
|---|---|---|---|---|---|
| 1234 | 2222 | 123 | USER A | JAPAN | DUPLEX, MONOCHROME |
| 1234 | 2223 | 124 | USER B | JAPAN | DUPLEX, FULL COLOR |
| 1234 | 2224 | 125 | USER C | USA | DUPLEX, MONOCHROME |
| 1236 | 2226 | 126 | XXXX | USA | DUPLEX, FULL COLOR |
| 1236 | 2226 | 127 | XXXX | USA | SINGLE-SIDE, FULL COLOR |

FIG.6

| LOCATION | PAGE DESCRIPTION LANGUAGE |
|---|---|
| JAPAN | RPCS |
| USA | PS |
| ⋮ | ⋮ |

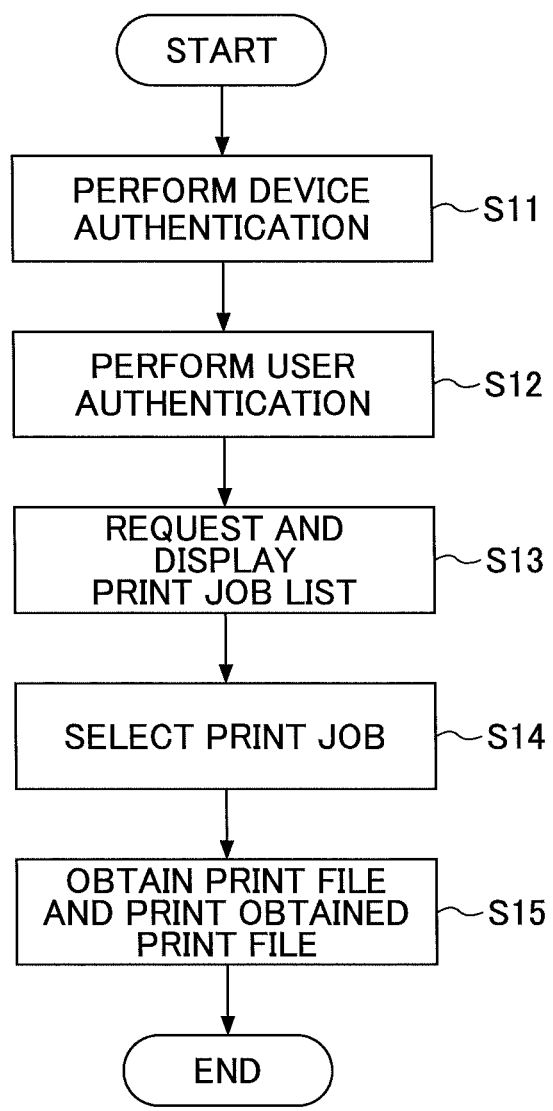

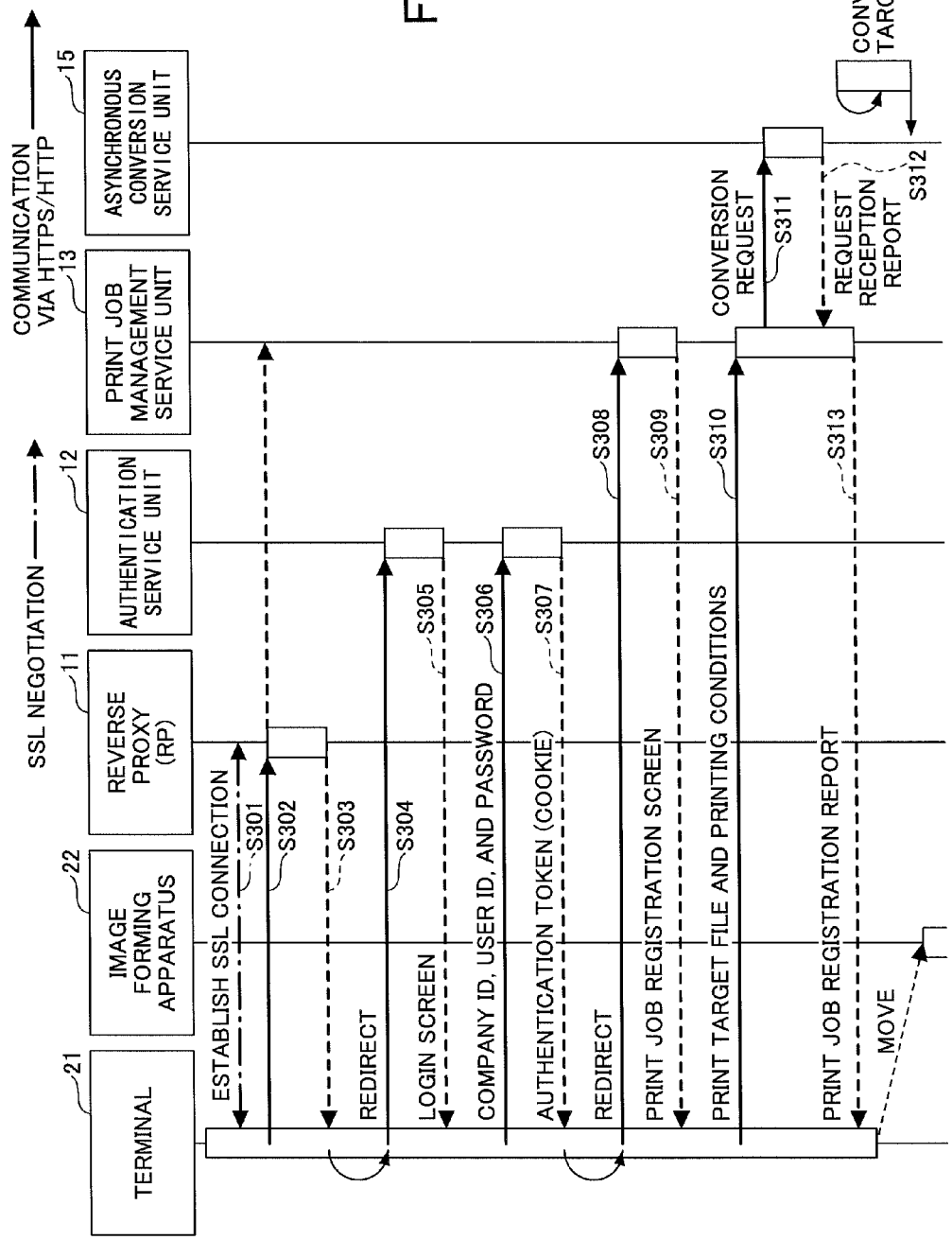

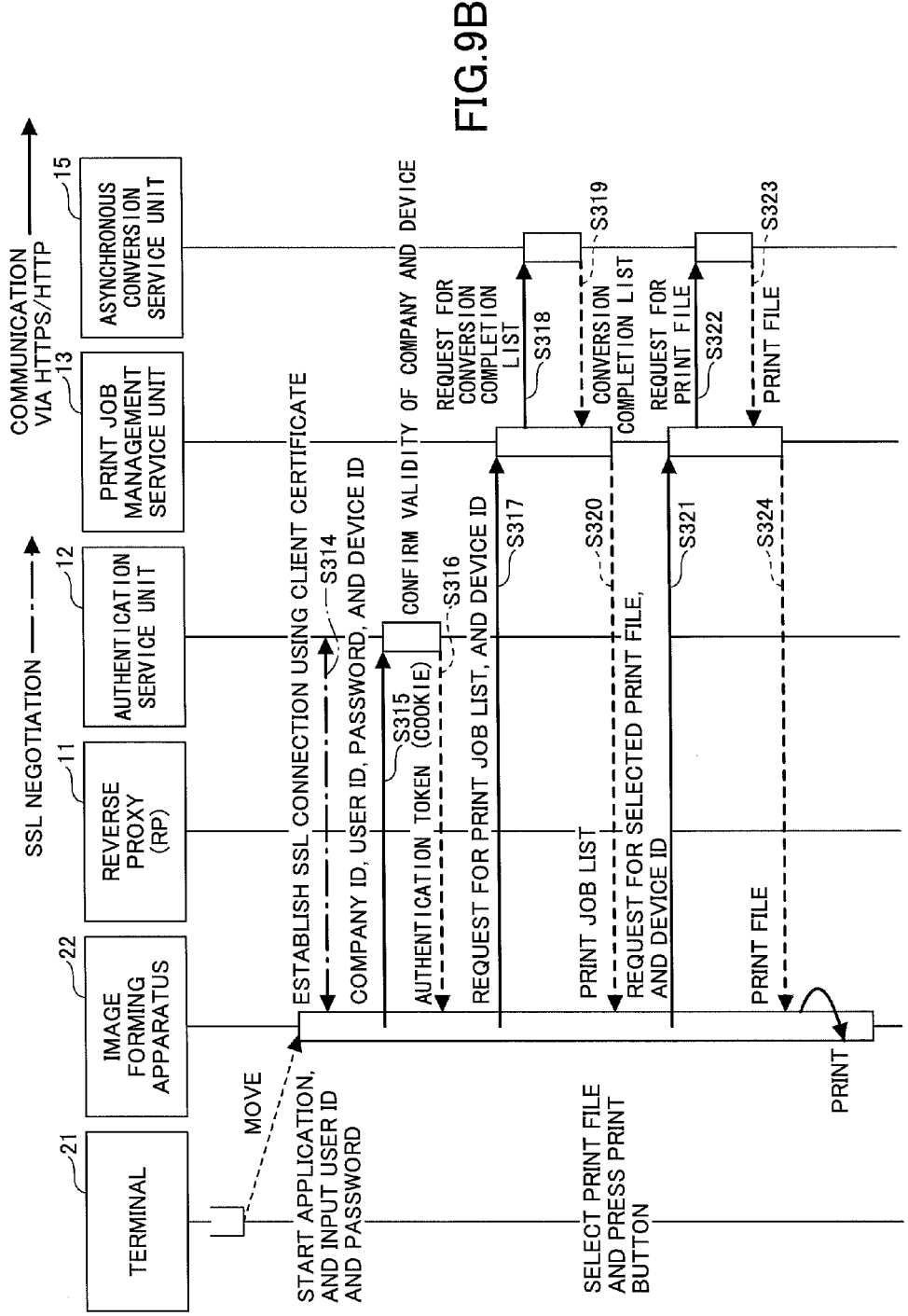

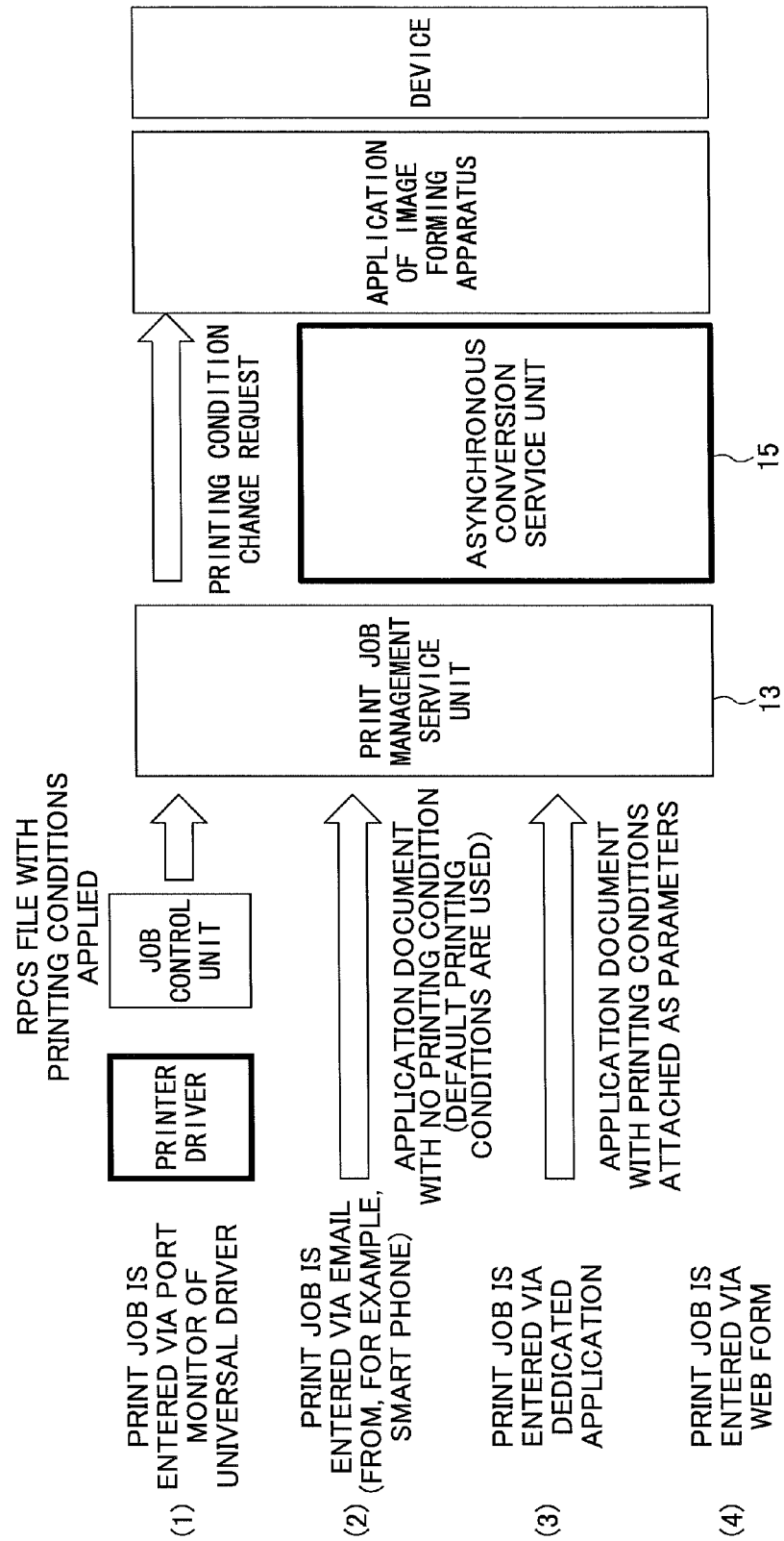

FIG.13A

| COMPANY ID | COMPANY NAME | USER ID | USER NAME | PASSWORD |
|---|---|---|---|---|
| 1234 | COMPANY A | 123 | USER A | 1234 |
| 1235 | COMPANY B | 124 | USER B | 1235 |
| 1236 | COMPANY C | 125 | USER C | 1236 |
| 1237 | COMPANY D | 126 | USER D | 1237 |
| 1238 | COMPANY E | 127 | USER E | 1238 |

FIG.13B

| CORPORATE GROUP ID | COMPANY ID | COMPANY ID | COMPANY ID | ... |
|---|---|---|---|---|
| G01 | 1234 | 1235 | 1236 | ... |
| G02 | 1237 | | | |
| ⋮ | | | | ⋮ |

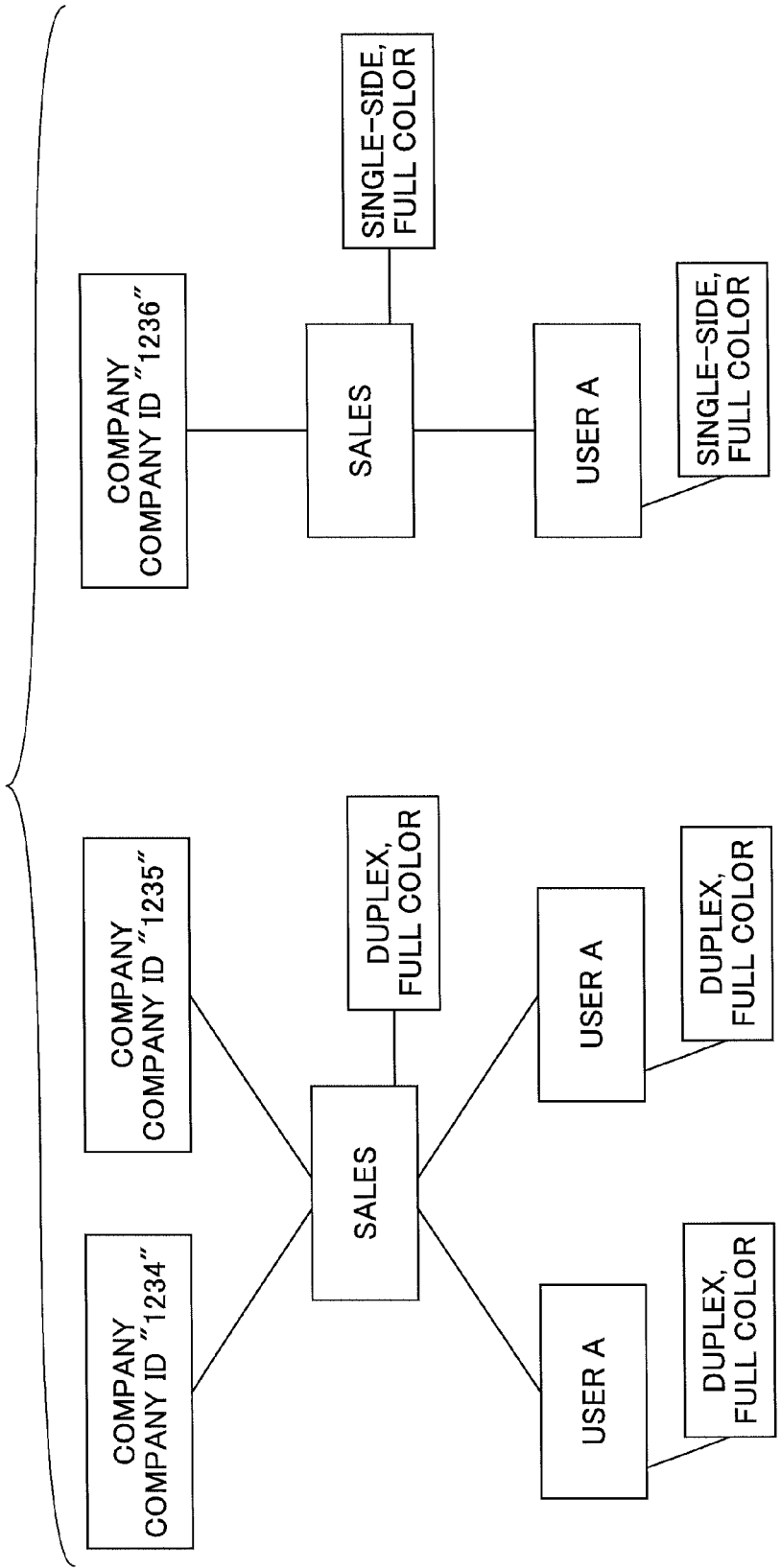

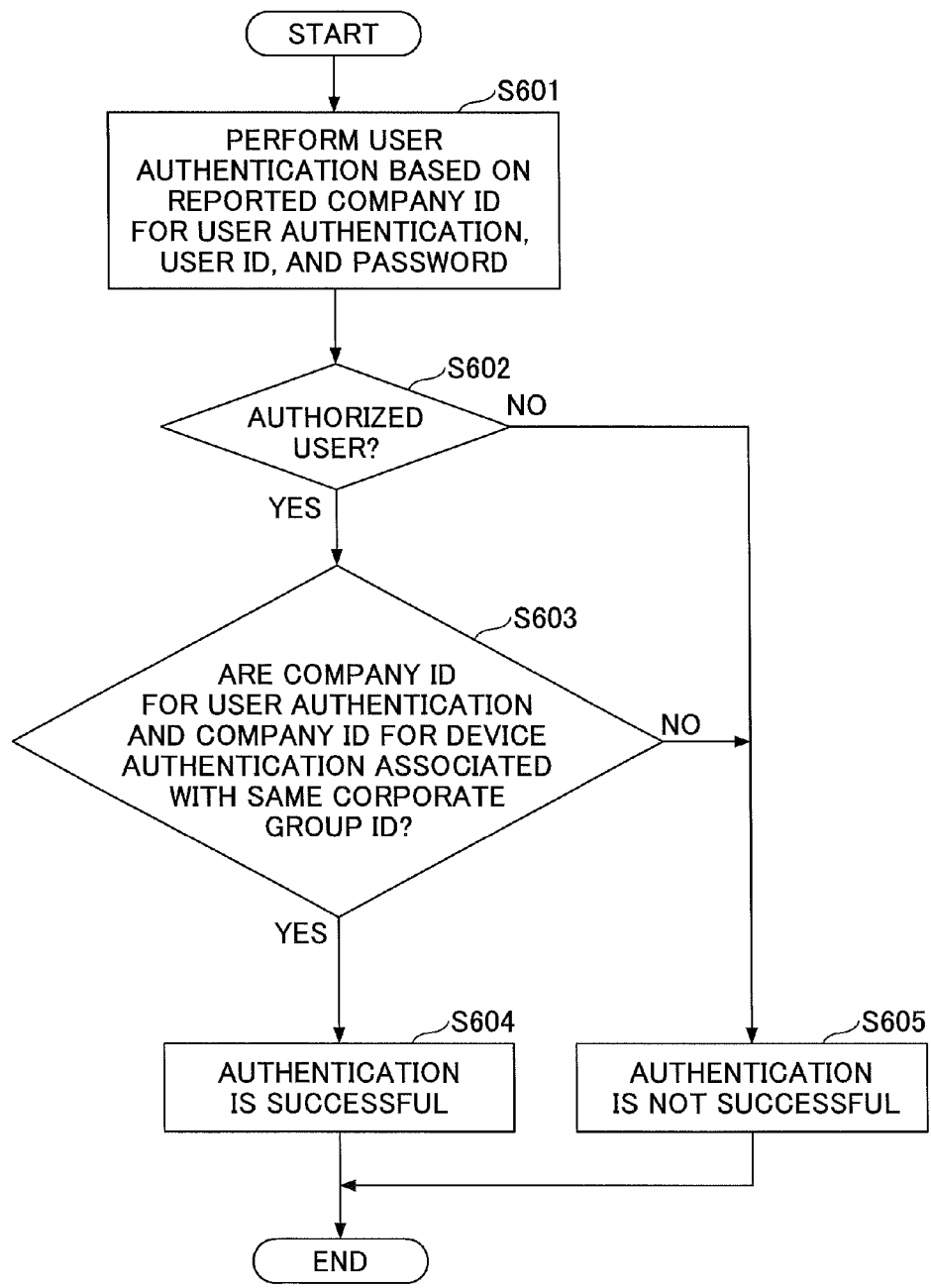

INFORMATION PROCESSING SYSTEM, INFORMATION PROCESSING APPARATUS, AND DATA CONVERSION METHOD

CROSS-REFERENCE TO RELATED APPLICATIONS

The present application is based upon and claims the benefit of priority of Japanese Patent Application No. 2012-020250 filed on Feb. 1, 2012, Japanese Patent Application No. 2012-101991 filed on Apr. 27, 2012, and Japanese Patent Application No. 2013-002199 filed on Jan. 10, 2013, the entire contents of which are incorporated herein by reference.

BACKGROUND OF THE INVENTION

1. Field of the Invention

An aspect of this disclosure relates to an information processing system, an information processing apparatus, and a data conversion method.

2. Description of the Related Art

In a so-called "pull-printing" system, print jobs received from terminals such as personal computers (PC) are not immediately printed but stored in an information processing apparatus such as a print server, and a logged-in user selects a print job from a list of the stored print jobs and prints the selected print job on an image forming apparatus such as a multifunction peripheral.

For example, Japanese Patent No. 4178823 discloses a pull-printing system where a server performs rendering and format conversion on content data specified by a client based on specification information of a client-side printing apparatus to generate print data that the client-side printing apparatus can print, and sends the generated print data to the client-side printing apparatus.

In such a pull-printing system, when a terminal enters a print job in an information processing apparatus, the terminal does not generally specify an image forming apparatus on which the print job is to be printed. Meanwhile, image forming apparatuses in a pull-printing system may support different printer languages (or page description languages).

Thus, since image forming apparatuses used for printing are not specified when print jobs are entered in a pull-printing system and different image forming apparatuses may support different page description languages, it is difficult to prepare print data before an image forming apparatus used for printing is selected. Meanwhile, if print data is generated after a request is received from an image forming apparatus (or an image forming apparatus is selected), the image forming apparatus needs to wait for the completion of the print data generation (or rendering) process before starting a printing process. As a result, the total printing time is increased.

To prevent this problem in a pull-printing system that supports multiple page description languages, it may be possible to prepare plural sets of print data in different page description languages in advance. However, this approach increases the time to generate print data, increases a storage area necessary to store the print data, and thereby increases the costs of a pull-printing system.

As another approach to prevent the above problem in a pull-printing system that supports multiple page description languages, it may be possible to prepare print data in a default page description language in advance and if an image forming apparatus selected for printing does not support the default page description language, to generate (or render) print data again in another page description language that the selected image forming apparatus supports. With this approach, however, since it is necessary to generate (or render) print data again when a selected image forming apparatus does not support the default page description language, the total printing time may still increase.

SUMMARY OF THE INVENTION

In an aspect of this disclosure, there is provided an information processing system implemented by one or more information processing apparatuses. The information processing system includes an electronic data receiving unit configured to receive electronic data via a network from an external apparatus; and a data conversion unit configured to identify at least one of an output setting and a data format corresponding to attribute information of a user operating the external apparatus by referring to a storage unit storing at least one of the output setting and the data format in association with the attribute information of the user, and convert the received electronic data into output data according to at least one of the output setting and the data format.

BRIEF DESCRIPTION OF THE DRAWINGS

FIG. 4 is a table illustrating an exemplary configuration of an authentication DB;

FIG. 5 is a drawing illustrating an exemplary configuration of a printing condition setting DB;

FIG. 6 is a table illustrating an exemplary configuration of a conversion DB;

FIG. 8 is a flowchart illustrating an exemplary printing process;

FIGS. 9A and 9B are parts of a sequence chart illustrating an exemplary print job registration process and an exemplary printing process in more detail;

FIG. 10 is a drawing used to describe printing condition setting methods for different types of terminals used to enter print jobs.

FIGS. 13A and 13B are exemplary tables registered in an authentication DB according to the second embodiment;

FIG. 15 is a drawing illustrating exemplary printing condition settings for sections with different company IDs; and FIG. 16 is a flowchart illustrating another exemplary user authentication process.

DESCRIPTION OF THE PREFERRED EMBODIMENTS

Preferred embodiments of the present invention are described below with reference to the accompanying drawings. In the embodiments, a printing system supporting pull printing is used as an example of an output system.

<Configuration of Printing System>

Figure 1:
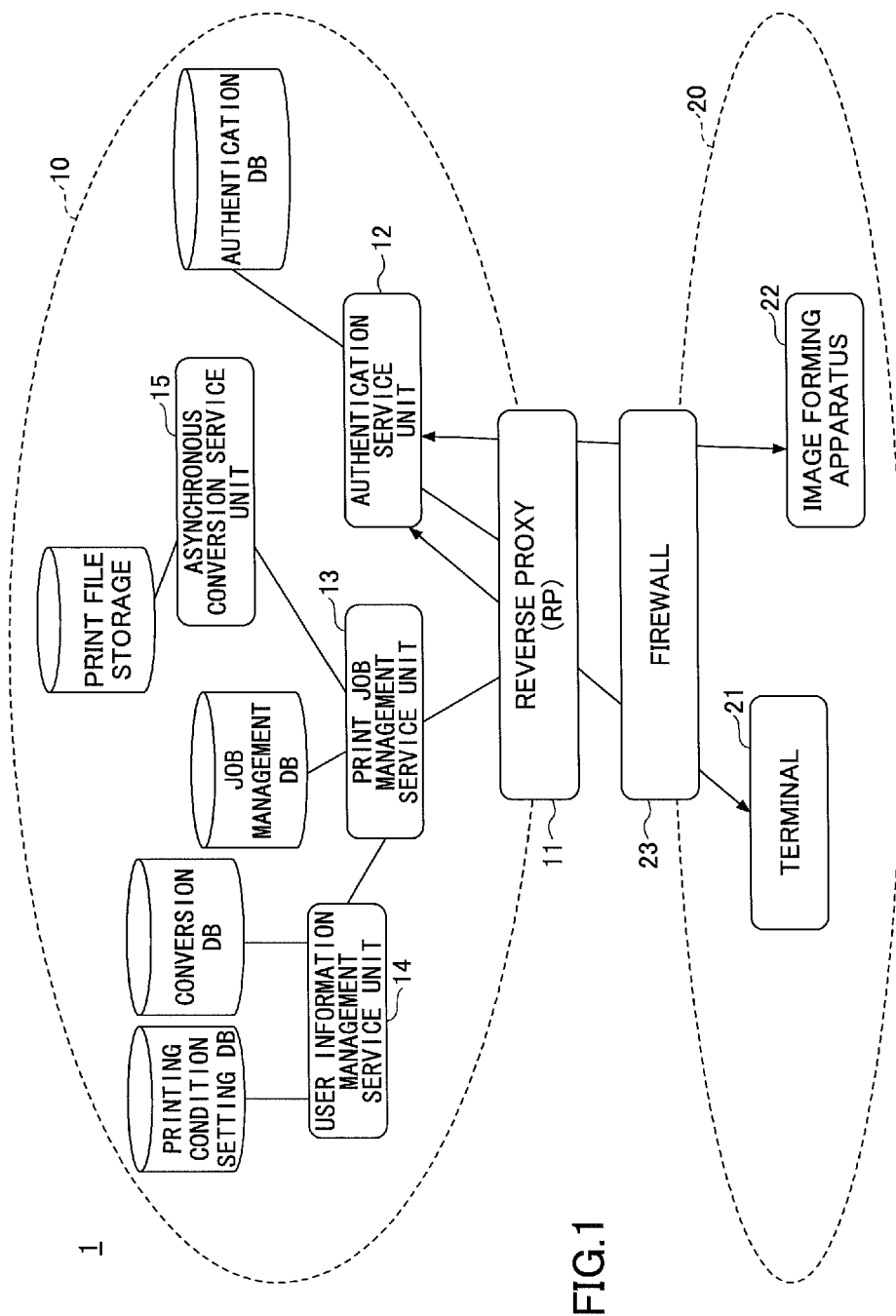
FIG. 1 is a drawing illustrating an exemplary configuration of a printing system according to an embodiment.

FIG. 1 is a drawing illustrating an exemplary configuration of a printing system 1 according to an embodiment. As illustrated in FIG. 1, the printing system 1 may include a network 10 providing a cloud service and a network 20 representing an internal network of, for example, a company. The network 10 and the network 20 are connected to each other via a reverse proxy (RP) 11 of the network 10, an external network such as the Internet, and a firewall 23 of the network 20.

The reverse proxy 11 is provided at a node between the network 10 and the external network (e.g., the Internet) and relays access from the external network to the inside of the network 10. The firewall 23 is provided at a node between the network 20 and the external network and relays access from the inside of the network 20 to the external network.

The network 10 provides a cloud service and includes one or more information processing apparatuses that provide various functions via, for example, Web applications and server applications. The network 10 may include an authentication service unit 12, a print job management service unit 13, a user information management service unit 14, an asynchronous conversion service unit 15, an authentication database (DB), a job management database (DB), a printing condition setting database (DB), a conversion database (DB), and a print file storage that are functional units implemented by the information processing apparatuses.

The network 20 is, for example, an internal network of a company and may include at least one terminal 21 and at least one image forming apparatus 22. The terminal 21 may be implemented by any apparatus such as a smartphone, a cell phone, a personal computer (PC), a tablet PC, or a projector that can enter (or output) a print job. The image forming apparatus 22 may be implemented by any apparatus such as a multifunction peripheral or a printer that can execute a print job.

In the printing system 1, after being authenticated by the authentication service unit 12 of the network 10, the terminal 21 sends a print job to the print job management service unit 13 of the network 10 and thereby "enters" the print job. Meanwhile, after being authenticated by the authentication service unit 12 of the network 10, the image forming apparatus 22 receives print data from the print job management service unit 13 of the network 10 and executes the corresponding print job.

The firewall 23 is provided to maintain the security of the network 20. The terminal 21 generates data (e.g., application data) to be printed according to user operations, and sends (or enters) a print job including the generated data to the network 10.

The image forming apparatus 22 displays a print job list that is a list of print jobs receivable from the network 10, and allows the user to select a print job from the print job list. When a print job is selected by the user from the print job list, the image forming apparatus 22 receives print data of the selected print job from the network 10 and prints the print data. The print data is obtained by converting (or rendering) data to be printed (which is hereafter referred to as "print target data") into a format that the image forming apparatus 22 can print.

The reverse proxy 11 functions as a proxy for the print job management service unit 13 and relays a request to the print job management service unit 13. With this configuration, the terminal 21 and the image forming apparatus 22 can access the print job management service unit 13 only via the reverse proxy 11. Accordingly, it is possible to improve the security of the printing system 1 by incorporating a security function in the reverse proxy 11.

The authentication service unit 12 performs authentication of the image forming apparatus 22 and users operating the terminal 21 and the image forming apparatus 22. The authentication service unit 12 performs authentication using the authentication DB. The print job management service unit 13 manages print jobs sent from (or entered by) the terminal 21 using the job management DB. The print job management service unit 13 also determines a format of a print file into which a print target file (a file to be printed) is converted based on the location (regional information) of the user. The user information management service unit 14 manages the printing condition setting DB and the conversion DB.

The asynchronous conversion service unit 15 converts (renders or translates) print target data into print data that the image forming apparatus 22 can print. More specifically, the asynchronous conversion service unit 15 converts print target data into a print file with a format (of, for example, a page description language) that the image forming apparatus 22 can print.

Assuming that image forming apparatuses 22 located in Japan support Refined Printing Command Stream (RPCS, registered trademark) and image forming apparatuses 22 located in the USA support PostScript (PS, registered trademark), the print job management service unit 13 selects RPCS as the format of a print file when the location of the user is Japan and selects PS as the format of a print file when the location of the user is the USA.

The asynchronous conversion service unit 15 converts data into a print file asynchronously with the reception of a conversion request from the print job management service unit 13. The location of the user may be registered in the printing condition setting DB or may be obtained from the IP address or a GPS chip of the terminal 21 when a print job is entered by the terminal 21.

In the present embodiment, it is assumed that user locations are registered in the printing condition setting DB. The conversion DB is managed by the user information management service unit 14 and stores formats supported by the image forming apparatuses 22 in association with locations (regional information).

In the printing system 1 of the present embodiment, when a print job is entered from the terminal 21, an image forming apparatus 22 on which the print job is to be executed (or a format that the image forming apparatus 22 supports) is estimated based on the location of the user operating the terminal 21. Also in the printing system 1, a print target file is converted into a print file with a format supported by the estimated image forming apparatus 22 asynchronously with the reception of a conversion request. This configuration makes it possible to provide a printing system supporting at least one of plural output settings and plural data formats without increasing the time necessary to output (print) print files.

<System Configuration>

Figure 2:
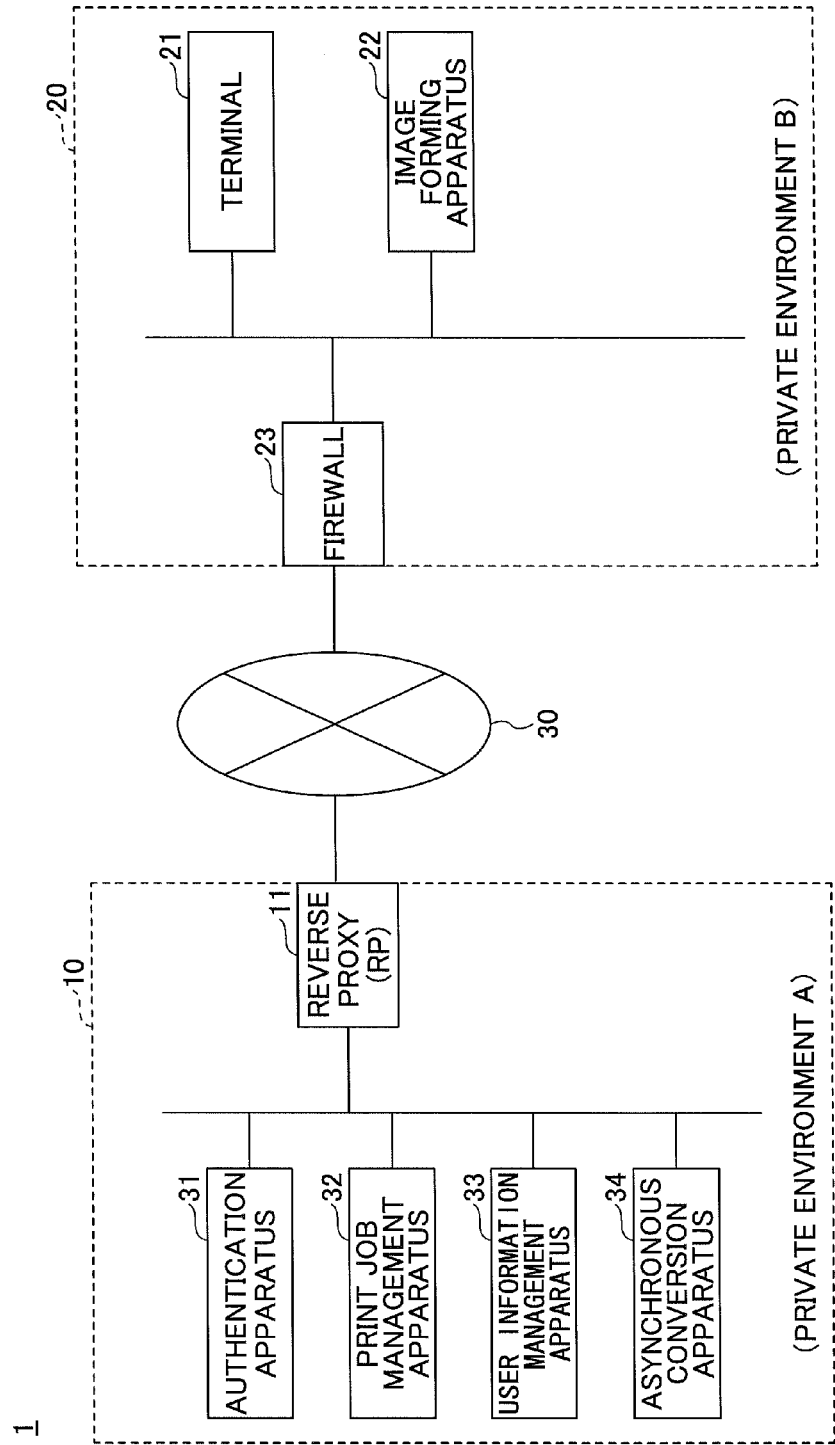
FIG. 2 is another drawing illustrating an exemplary configuration of a printing system according to an embodiment.

FIG. 2 is another drawing illustrating an exemplary configuration of the printing system 1 according to the present embodiment. In FIG. 2, the network 10 providing a cloud service and the network 20 such as an internal network of a company are connected to each other via a public network 30 such as the Internet.

The network 10 (private environment A) may include the reverse proxy 11, an authentication apparatus 31, a print job management apparatus 32, a user information management apparatus 33, and an asynchronous conversion apparatus 34. The network 20 (private environment B) may include the terminal 21, the image forming apparatus 22, and the firewall 23.

The configuration of the printing system 1 illustrated in FIG. 2 is just an example. As an alternative configuration, for example, one or both of the terminal 21 and the image forming apparatus 22 may be located outside of the network 20, i.e., outside of the firewall 23.

The authentication apparatus 31 implements the authentication service unit 12 and the authentication DB of FIG. 1. The print job management apparatus 32 implements the print job management service unit 13 and the job management DB of FIG. 1. The user information management apparatus 33 implements the user information management service unit 14, the printing condition setting DB, and the conversion DB of FIG. 1. The asynchronous conversion apparatus 34 implements the asynchronous conversion service unit 15 and the print file storage of FIG. 1.

The authentication apparatus 31, the print job management apparatus 32, the user information management apparatus 33, and the asynchronous conversion apparatus 33 may be implemented by one computer or two or more computers. Also, the authentication DB, the job management DB, the printing condition setting DB, the conversion DB, and the print file storage may instead be implemented by database apparatuses and a file storage apparatus that are provided separately from the authentication apparatus 31, the print job management apparatus 32, the user information management apparatus 33, and the asynchronous conversion apparatus 34.

The terminal 21 generates print target data (e.g., document data, image data, etc.) to be printed using software (or applications). The terminal 21 may also store print target data that is received from another apparatus (not shown). After being authenticated by the authentication apparatus 31, the terminal 21 sends a print job including print target data to the print job management apparatus 32. The print job management apparatus 32 queries the user information management apparatus 33 about a format supported by the image forming apparatus 22 corresponding to the location of the user (the format may be hereafter referred to as a "supported format").

When receiving the supported format from the user information management apparatus 33, the print job management apparatus 32 sends a conversion request to the asynchronous conversion apparatus 34 to request conversion of the print target data into the supported format. The user information management apparatus 33 identifies the supported format using the printing condition setting DB and the conversion DB and sends information indicating the supported format to the print job management apparatus 32.

The asynchronous conversion apparatus 34 converts the print target data into a print file with the supported format asynchronously with the reception of the conversion request from the print job management apparatus 32. For example, the asynchronous conversion apparatus 34 reads the print target data from the print file storage and converts (or renders) the print target data into a print file with the supported format that the image forming apparatus 22 supports.

After being authenticated by the authentication apparatus 31, the image forming apparatus 22 receives a print job list, which is a list of receivable print jobs, from the print job management apparatus 32. Then, the image forming apparatus 22 displays the print job list on, for example, an operations panel and requests the user to select a print job from the print job list. When a print job is selected, the image forming apparatus 22 requests a print file corresponding to the selected print job from the print job management apparatus 32.

The print job management apparatus 32 obtains the requested print file from the asynchronous conversion apparatus 34 and sends the obtained print file to the image forming apparatus 22. The image forming apparatus 22 receives and prints the print file.

Thus, in the printing system 1 of the present embodiment, an image forming apparatus 22 (or the type of image forming apparatus 22) on which a print file is to be executed is estimated based on the location of the user operating the terminal 21. Also in the printing system 1, a print target file (or print target data) is converted into a print file asynchronously with (or before) transmission of a request for the print file from the image forming apparatus 22 to the print job management apparatus 32. This configuration makes it possible to provide a pull-printing system supporting at least one of plural output settings and plural data formats without increasing the time necessary to start printing.

Compared with a system where plural print files with different formats are prepared, the configuration of the printing system 1 of the present embodiment makes it possible to reduce the time necessary to generate print files, reduce the storage area necessary to store the print files, and thereby reduce the costs of the printing system 1. Also, by estimating an image forming apparatus 22 to be used for printing and generating a print file based on the estimation result, it is possible to reduce the probability that the generated print file cannot be printed on an actually-used image forming apparatus 22.

<Hardware Configuration>

Figure 3:
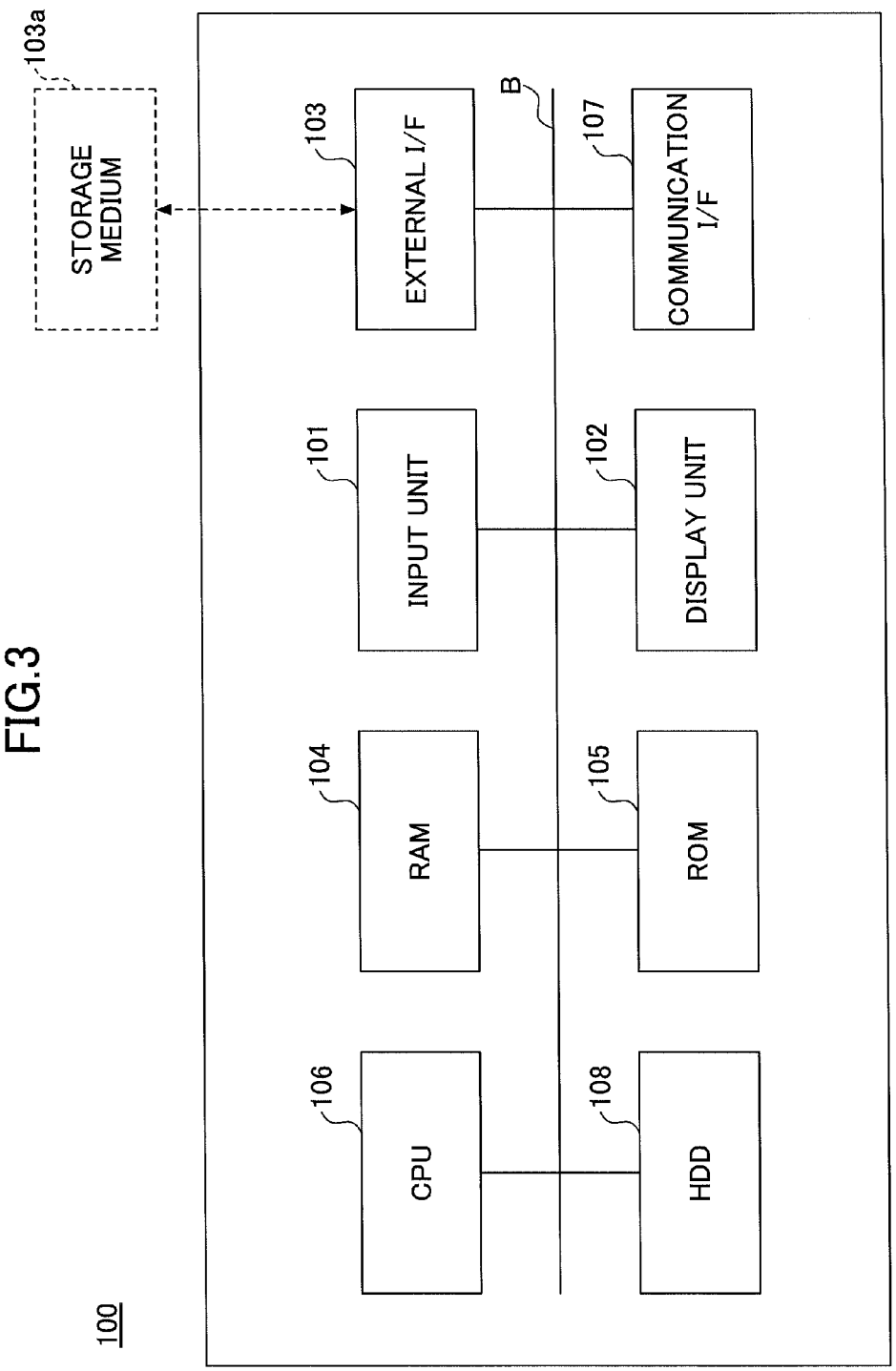
FIG. 3 is an exemplary hardware configuration of an information processing apparatus according to an embodiment.

Each of the authentication apparatus 31, the print job management apparatus 32, the user information management apparatus 33, and the asynchronous conversion apparatus 34 may be implemented by an information processing apparatus 100 having a hardware configuration as illustrated in FIG. 3. FIG. 3 is a block diagram illustrating an exemplary hardware configuration of the information processing apparatus 100 according to the present embodiment.

As illustrated in FIG. 3, the information processing apparatus 100 includes an input unit 101, a display unit 102, an external I/F 103, a random access memory (RAM) 104, a read-only memory (ROM) 105, a central processing unit (CPU) 106, a communication I/F 107, and a hard disk drive (HDD) 108 that are connected to each other via a bus B.

The input unit 101 includes, for example, a keyboard and a mouse, and is used to input instructions (or operation signals) to the information processing apparatus 100. The display unit 102 displays, for example, processing results of the information processing apparatus 100.

The communication I/F 107 is an interface for connecting the information processing apparatus 100 to a network. The information processing apparatus 100 can perform data communications with other apparatuses via the communication I/F 107.

The HDD 108 is a non-volatile storage device for storing various programs and data. For example, the HDD 108 stores basic software or an operating system (OS) for controlling the entire information processing apparatus 100, and application software for providing various functions on the OS. The HDD 108 may manage the stored programs and data using a file system and/or a database (DB).

The external I/F 103 is an interface between the information processing apparatus 100 and an external device such as a storage medium 103*a*. The information processing apparatus 100 can read and write data from and to the storage medium 103*a* via the external I/F 103. The storage medium 103*a* may be implemented by, for example, a flexible disk, a compact disk (CD), a digital versatile disk (DVD), a secure digital (SD) memory card, or a universal serial bus (USB) memory.

The ROM 105 is a non-volatile semiconductor memory (storage unit) that can retain programs and data even when power is turned off. For example, the ROM 105 stores programs and data such as a basic input/output system (BIOS) that is executed when the information processing apparatus 100 is turned on, and system and network settings of the information processing apparatus 100. The RAM 104 is a volatile semiconductor memory (storage unit) for temporarily storing programs and data.

The CPU (processor) 106 loads programs and data from storage units (e.g., the HDD 108 and the ROM 105) into the RAM 104 and executes the loaded programs to control the information processing apparatus 100 and to implement various functional units of the information processing apparatus 100.

With the hardware configuration described above, the authentication apparatus 31, the print job management apparatus 32, the user information management apparatus 33, and the asynchronous conversion apparatus 34 can perform processes as described later. Although the hardware configurations of the reverse proxy 11, the terminal 21, the image forming apparatus 22, and the firewall 23 are omitted here, these apparatuses may also have a hardware configuration similar to that illustrated in FIG. 3.

<Processes Performed by Printing System>

Exemplary processes performed by the printing system 1 are described below.

<Information Registration Process>

For example, an administrator having administrative rights of the network 20 accesses a uniform resource locator (URL) of the authentication apparatus 31 using the terminal 21 including a browser and registers user names and passwords in the authentication DB. FIG. 4 is a table illustrating an exemplary configuration of the authentication DB. As illustrated in FIG. 4, the authentication DB may include company IDs, company names, user IDs, user names, and passwords.

The company IDs are identification information for uniquely identifying companies. The company names are names of companies. The user IDs are identification information for uniquely identifying users. The user names are names of users. The passwords are secret identification information.

The administrator also accesses a URL of the user information management apparatus 33 and registers information in the printing condition setting DB as illustrated in FIG. 5 and the conversion DB as illustrated in FIG. 6. FIG. 5 is a drawing illustrating an exemplary configuration of the printing condition setting DB. As illustrated in FIG. 5, the printing condition setting DB may include a company table, a section table, and a user table. FIG. 5 (a) is an example of the company table. The company table may include company IDs, company names, locations, and printing conditions.

FIG. 5 (b) is an example of the section table. The section table may include company IDs, section IDs, section names, locations, and printing conditions. FIG. 5 (c) is an example of the user table. The user table may include company IDs, section IDs, user IDs, user names, locations, and printing conditions.

The locations are regional information indicating, for example, countries to which companies, sections, or users belong. The printing conditions specify, for example, a printing mode such as "duplex printing" or "single-side printing" and a color mode such as "full color" or "monochrome". The section IDs are identification information for uniquely identifying sections (divisions, groups, branches, etc.). The section names are names of sections.

As illustrated in FIG. 5, the company table, the section table, and the user table are linked to each other by the company ID field and the section ID field. With the printing condition setting DB of FIG. 5, a location can be identified based on a company ID, a section ID, or a user ID. For example, in the company table of FIG. 5 (a), the location corresponding to company ID "1234" is "Japan". In the section table of FIG. 5 (b), the location corresponding to section ID "2222" is "Japan". In the user table of FIG. 5 (c), the location corresponding to user ID "123" is "Japan".

Default (or initial) printing conditions are registered in the company table, the section table, and the user table. For example, in the company table of FIG. 5 (a), printing conditions "duplex printing, monochrome" are registered for company ID "1234". In the section table of FIG. 5 (b), the same printing conditions "duplex printing, monochrome" are registered for section ID "2222" that belongs to company ID "1234" (i.e., the printing conditions are inherited by section ID "2222"). Similarly, in the user table of FIG. 5 (c), the same printing conditions "duplex printing, monochrome" are registered for user ID "123" that belongs to company ID "1234" and section ID "2222" (i.e., the printing conditions are inherited by user ID "123").

FIG. 6 is a table illustrating an exemplary configuration of the conversion DB. As illustrated in FIG. 6, the conversion DB includes locations and page description languages that are associated with each other. Page description languages are examples of formats of print files. With the conversion DB of FIG. 6, a page description language can be identified based on a location. In the example of FIG. 6, RPCS (registered trademark) is registered as the page description language for location "Japan", and PS (registered trademark) is registered as the page description language for location "USA".

(Print Job Registration Process)

Figure 7:
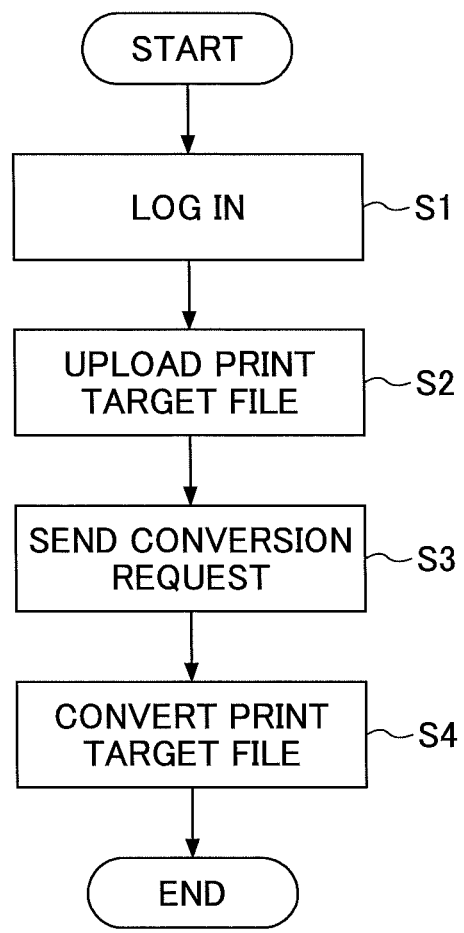
FIG. 7 is a flowchart illustrating an exemplary print job registration process.

FIG. 7 is a flowchart illustrating an exemplary print job registration process. Here, it is assumed that the printing system 1 is configured as illustrated in FIG. 1. In step S1, the user performs a login operation by entering a company ID, a user ID, and a password using, for example, a browser of the terminal 21. The authentication service unit 12 of the network 10 performs authentication of the user by referring to the authentication DB as illustrated in FIG. 4. When the combination of the company ID, the user ID, and the password entered via the terminal 21 is registered in the authentication DB, the authentication service unit 12 determines that the user is an authorized user and the login is successful.

When the login is successful, the terminal 21 is redirected to a screen of the print job management service unit 13 of the network 10. In other words, the terminal 21 is directed to a different URL.

In step S2, the user uploads a print target file (or print target data) to be printed, from the terminal 21 to the print job management service unit 13. In this step, the user (or the terminal 21) may also upload printing conditions together with the print target file to the print job management service unit 13. The printing conditions may include, for example, printing modes such as duplex printing and single-side printing, color modes such as full color and monochrome, and the number of copies. The user may upload plural print target files from the terminal 21 to the print job management service unit 13.

In step S3, the print job management service 13 sends a conversion request including the file name of the uploaded print target file, a page description language, and printing conditions to the asynchronous conversion service unit 15. Here, the print job management service unit 13 can select the page description language and the printing conditions by querying the user information management service unit 14.

Also, the print job management service unit 13 associates the uploaded print target file, the company ID, the section ID, and the user ID with each other using the job management DB to manage print jobs.

In step S4, the asynchronous conversion service unit 15 converts the print target file into a print file based on the page description language and the printing conditions in the conversion request. Step S4 is performed asynchronously with the reception of the conversion request. The asynchronous conversion service unit 15 stores the print file obtained by converting the print target file in, for example, the print file storage. Thus, according to the print job registration process of FIG. 7, a print target file is converted into a print file asynchronously with the reception of a conversion request from the terminal 21.

<Printing Process>

FIG. 8 is a flowchart illustrating an exemplary printing process. The user enters a user ID and a password by operating, for example, an operations panel of the image forming apparatus 22. The image forming apparatus 22 establishes an SSL connection with the reverse proxy 11 using a client certificate associated in advance with the image forming apparatus 22. The image forming apparatus 22 sends a serial number unique to the image forming apparatus 22 (device), the user ID, the password, and a company ID set in the image forming apparatus 22 to the authentication service unit 12.

In step S11, the authentication service unit 12 performs authentication of the image forming apparatus 22 (device authentication). At this stage, since the image forming apparatus 22 is managed in association with the company ID, the authentication service unit 12 can determine that the image forming apparatus 22 belongs to a certain company in addition to determining that the image forming apparatus 22 is a valid device having the client certificate.

In step S12, the authentication service unit 12 performs authentication of the user of the image forming apparatus 22 (user authentication). The authentication service unit 12 performs authentication of the user by referring to the authentication DB of FIG. 4 based on the user ID, the password, and the company ID sent from the image forming apparatus 22. When the combination of the user ID, the password, and the company ID sent from the image forming apparatus 22 is registered in the authentication DB, the authentication service unit 12 determines that the user is an authorized user and the authentication is successful. When the authentication is successful, the image forming apparatus 22 receives an authentication ticket from the authentication service unit 12.

In step S13, the image forming apparatus 22 requests a print job list from the print job management service unit 13 by using the authentication ticket. The validity of the authentication ticket is confirmed, for example, by a policy agent (Web agent) provided in the reverse proxy 11. A company ID and a user ID associated with the authentication ticket may be sent to the print job management service unit 13 together with the request for the print job list. Here, the policy agent is a component that obtains policy information and sends the obtained policy information to another component that needs the policy information to provide a security service.

The print job management service unit 13 requests the asynchronous conversion service unit 15 to send a conversion completion list, which indicates format conversion status, i.e., whether print target files have been converted into print files, based on a print job list of print jobs that are associated with the company ID and the user ID. When receiving the conversion completion list, the print job management service unit 13 sends the print job list including the format conversion status to the image forming apparatus 22. The image forming apparatus 22 displays the print job list on the operations panel.

In step S14, the user selects one or more print files (or print jobs) from the displayed print job list and requests printing of the selected print files. The image forming apparatus 22 may be configured to display the print job list such that print files of printable (or receivable) print jobs are displayed as selectable items and print files of non-printable (or non-receivable) print jobs are displayed as non-selectable items. Also, the image forming apparatus 22 may be configured to display the print job list such that all print files of printable print jobs are selected by default to reduce user operations.

In step S15, the image forming apparatus 22 requests the selected print files from the print job management service unit 13. The print job management service unit 13 obtains the requested print files from the asynchronous conversion service unit 15 and sends the obtained print files to the image forming apparatus 22. The image forming apparatus 22 receives and prints the print files.

Thus, in the printing process of FIG. 8, the image forming apparatus 22 can print a print file that is converted into a supported format based on the location of the user operating the terminal 21.

<Print Job Registration Process and Printing Process>

FIGS. 9A and 9B are parts of a sequence chart illustrating details of a print job registration process and a printing process. Here, it is assumed that the printing system 1 is configured as illustrated in FIG. 1. In step S301, the terminal 21 establishes an SSL connection with the reverse proxy 11.

In step S302, the terminal 21 tries to access the print job management service unit 13 via the reverse proxy 11. However, since the terminal 21 has no authentication token, the reverse proxy 11 redirects the terminal 21 to a login screen of the authentication service unit 12 in steps S303 and S304.

In step S305, the terminal 21 receives the login screen. The user performs a login operation on the login screen. In step S306, the terminal 21 sends a company ID, a user ID, and a password to the authentication service unit 12. The authentication service unit 12 performs authentication of the user by referring to the authentication DB.

When the combination of the company ID, the user ID, and the password entered via the terminal 21 is registered in the authentication DB, the authentication service unit 12 determines that the user is an authorized user and the login is successful. When the login is successful, in step S307, the authentication service unit 12 sends an authentication token to the terminal 21.

In step S308, since the terminal 21 has the authentication token, the terminal 21 is redirected to a print job registration screen of the print job management service unit 13. In step S309, the print job management service unit 13 sends the print job registration screen to the terminal 21. The terminal 21 receives and displays the print job registration screen. The user specifies a print target file (e.g., a document) on the print job registration screen. The user can also specify printing conditions on the print job registration screen.

In step S310, the terminal 21 sends the print target file and the printing conditions to the print job management service 13. As described above, the print job management service 13 queries the user information management service 14 about a print file format corresponding to the location of the user operating the terminal 21. Then, based on a response from the user information management service unit 14, the print job management service unit 13 determines the print file format.

In step S311, the print job management service unit 12 sends a conversion request to the asynchronous conversion service unit 15 to request conversion of the print target file into the determined print file format. In step S312, the asynchronous conversion service 15 returns a request reception report to the print job management service unit 13. In step S313, the print job management service unit 13 sends, to the terminal 21, a print job registration report indicating that a print job has been successfully registered. Meanwhile, the asynchronous conversion service unit 15 converts the print target file requested by the conversion request into a print file according to the print file format and the printing conditions in the conversion request. The asynchronous conversion service 15 performs the conversion asynchronously with the reception of the conversion request at step S311. For example, the asynchronous conversion service unit 15 stores the print file obtained by converting the print target file in the print file storage.

After registering the print job, the user operating the terminal 21 moves to a location where the image forming apparatus 22 is installed. The user starts an application of the image forming apparatus 22 and enters a user ID and a password. In step S314, the image forming apparatus 22 establishes an SSL connection with the reverse proxy 11 using a client certificate.

In step S315, the image forming apparatus 22 sends a serial number (device ID) unique to the image forming apparatus 22 (device), a company ID, a user ID, and a password to the authentication service unit 12. The authentication service unit 12 confirms the validity of the company, and the validity (location or presence) of the image forming apparatus 22 (device authentication).

At this stage, the authentication service unit 12 can determine that the image forming apparatus 22 belongs to a certain company identified by the company ID in addition to determining that the image forming apparatus 22 is a valid device having the client certificate.

When the validity of the company and the image forming apparatus 22 is successfully confirmed, the authentication service unit 12 performs user authentication. The authentication service unit 12 performs user authentication by referring to the authentication DB of FIG. 4 based on the user ID, the password, and the company ID sent from the image forming apparatus 22.

When the user authentication is successful, in step S316, the authentication service unit 12 sends an authentication token to the image forming apparatus 22. In step S317, the image forming apparatus 22 requests a print job list from the print job management service 13 using the authentication token, and also sends the device ID to the print job management service unit 13.

The validity of the authentication token is confirmed, for example, by a policy agent provided in the reverse proxy 11. When the validity of the authentication token is confirmed, the reverse proxy 11 sends the company ID and the user ID associated with the authentication token to the print job management service 13 together with the request for the print job list.

In step S318, the print job management service unit 13 requests the asynchronous conversion service unit 15 to send a conversion completion list indicating format conversion status, i.e., whether print target files have been converted into print files. In step S319, the asynchronous conversion service unit 15 sends the conversion completion list to the print job management service 13.

In step S320, the print job management service unit 13 sends the print job list including the format conversion status to the image forming apparatus 22. The image forming apparatus 22 displays the print job list on the operations panel.

Then, the user selects one or more print files (i.e., documents the user needs to print) from the displayed print job list and requests printing of the selected print files (e.g., by pressing a print button).

In step S321, the image forming apparatus 22 requests the selected print files (or documents to be printed) from the print job management service unit 13, and also sends the device ID to the print job management service unit 13.

In step S322, the print job management service unit 13 requests the asynchronous conversion service unit 15 to send the print files requested by the image forming apparatus 22. In step S323, the asynchronous conversion service unit 15 sends the requested print files (or documents to be printed) to the print job management service unit 13. In step S324, the print job management service unit 13 sends the requested print files to the image forming apparatus 22. Then, the image forming apparatus 22 receives and prints the print files.

<Printing Condition Setting>

FIG. 10 is a drawing used to describe printing condition setting methods for different types of terminals used to enter print jobs. FIG. 10 illustrates how printing conditions are set and print target files are rendered (or converted) for different types of terminals 21 used to enter print jobs.

FIG. 10 (1) illustrates a case where a print job is entered via a port monitor of a universal driver (printer driver). In this case, the user can set various printing conditions for rendering via the printer driver.

FIG. 10 (2) illustrates a case where a print job is entered via an email message. In this case, printing conditions for rendering cannot be set at the terminal 21. Here, for example, rules for embedding printing conditions in a title of an email message may be determined to enable transmission of printing conditions to the print job management service unit 13 even when a print job is entered via email. However, it is difficult or bothersome for a user to remember such rules for embedding printing conditions. Therefore, in the present embodiment, when a print job is entered via an email message, the print job management service unit 13 refers to default printing conditions that are set in advance and performs rendering according to the default printing conditions. Also in the case of FIG. 10 (2), a print job registration screen where default printing conditions are set may be sent to the terminal 21.

FIG. 10 (3) illustrates a case where a print job is entered via a dedicated application of a mobile terminal such as a smartphone. Here, a web browser of a smartphone often does not have a function to upload a file. For this reason, in the case of FIG. 10 (3), a dedicated application is used to set printing conditions for rendering and send an application document with the printing conditions attached as parameters to the print job management service unit 13.

FIG. 10 (4) illustrates a case where a print job is entered via a Web form displayed by a Web browser of, for example, a personal computer (PC). In this case, a user interface of a Web browser is used to set printing conditions for rendering and send an application document with the printing conditions attached as parameters to the print job management service unit 13.

The default (or initial) printing conditions used when a print job is entered via email may be set by an administrator using, for example, a Web browser for each company, each section of a company, or each user. The default printing conditions for a user may inherit the default printing conditions for a company or a section. Also, a user may change the default printing conditions as desired using, for example, a Web browser.

Also in the case of FIG. 10 (2) where a print job is entered via an email message, the user may set default printing conditions from a Web browser before sending the email message. Thus, in practice, the user can freely change the default printing conditions as desired.

Figure 11:
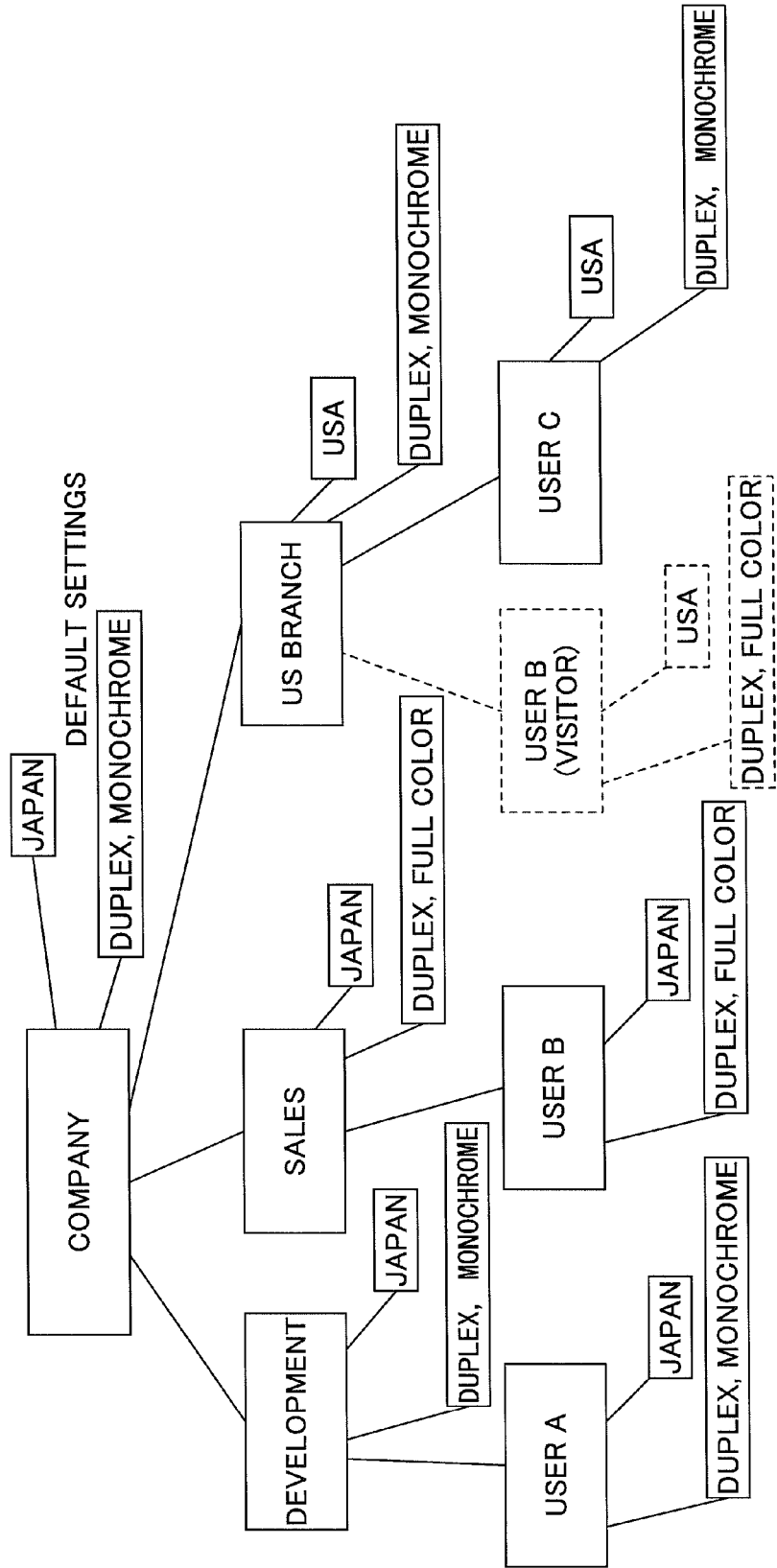
FIG. 11 is a drawing used to describe a printing condition setting method where printing conditions are set depending on locations and sections of terminals.

Next, an exemplary method of setting printing conditions depending on locations and sections of the terminals 21 is described with reference to FIG. 11. In FIG. 11, it is assumed that location "Japan" and printing conditions "duplex printing, monochrome" are set as default settings of the terminals 21 in a company.

FIG. 11 is a drawing used to describe a printing condition setting method where printing conditions are set depending on locations and sections of terminals. In FIG. 11, location "Japan" and printing conditions "duplex printing, monochrome" are set as default settings for a company. Here, it is also assumed that the image forming apparatuses 22 located in Japan support RPCS (registered trademark) as the page description language. Accordingly, print jobs entered by users in Japan are converted according to RPCS (registered trademark).

A section "development" of the company inherits the printing conditions in the default settings of the company without change. Meanwhile, for a section "sales" where many documents are submitted to clients, the printing conditions are changed to "duplex printing, full color". Therefore, a user B belonging to the section "sales" can use the printing conditions "duplex printing, full color" as default settings without changing the printing conditions by himself/herself.

Meanwhile, for a section "US branch", the location "Japan" in the default settings is changed to "USA". Accordingly, print jobs entered by a user C of the section "US branch" are converted according to PS (registered trademark) that is set by default for the location "USA". When the user B visits the section "US branch", the user B can enter a print job in the same manner as in Japan and output a print file on an image forming apparatus 22 supporting PS (registered trademark) by changing the location of the user B in the user table of FIG. 5 (c) from "Japan" to "USA".

A time limit may be set for a location change in the user table of FIG. 5 (c). For example, when the time limit is exceeded, the changed location in the user table may be automatically restored by the user information management service unit 14 to its original setting. Such a configuration is convenient, for example, for a user making an overseas business trip.

In the conversion DB of FIG. 6, locations and page description languages (or formats) are associated with each other. Alternatively, the conversion DB may be configured to store positional information obtained based on IP addresses or GPS locations of terminals 21 in association with formats.

Here, print target files uploaded by a user before the location of the user in the user table of FIG. 5 (c) is changed from "Japan" to "USA" are converted according to RPCS (registered trademark) based on the original location "Japan" and stored in the print file storage.

However, even the print target files uploaded before the location is changed from "Japan" to "USA" are preferably converted according to PS (registered trademark) based on the changed location "USA" and stored in the print file storage.

Therefore, the print job management service 13 may be configured to convert print target files uploaded before and after the location is changed from "Japan" to "USA" into PS (registered trademark) print files based on the changed location "USA" and store the print files in the print file storage.

For example, the print job management service 13 may be configured to start converting print target files uploaded before the location change according to PS (registered trademark) based on the changed location "USA" when the location change and/or the login of the user from an image forming apparatus 22 in the USA is detected.

When a time limit is set for a location change and the time limit is exceeded, print target files uploaded before the time limit is exceeded may be converted according to RPCS (registered trademark) based on the original location "Japan" and stored in the print file storage.

<Summary>

As described above, in the printing system 1 of the present embodiment, an image forming apparatus 22 to be used for printing is estimated and a print target file is converted into a print file with a format supported by the estimated image forming apparatus 22. This configuration makes it possible to provide a pull-printing system that supports plural formats without redoing rendering of print target files.

The printing system 1 of the present embodiment also makes it possible to set printing conditions depending on limitations of various types of terminals 21 used to enter print jobs and thereby makes it possible to flexibly perform pull-printing without being limited by business and living locations.

<<Second Embodiment>>

With the configuration of the first embodiment, when a user uses an image forming apparatus 22 having a company ID that is different from a company ID associated with the user, authentication of the user fails and the user cannot print a print file even if the image forming apparatus 22 is located in a company to which the user belongs or a company in the same corporate group.

For example, when different company IDs are used at Japanese headquarters of a company A and at a US branch of the company A, a user belonging to the Japanese headquarters cannot print an uploaded print target file by using an image forming apparatus 22 located in the US branch of the company A. A second embodiment makes it possible to print a print file on an image forming apparatus 22 having a company ID that is different from a company ID associated with the user.

<System Configuration>

Figure 12:
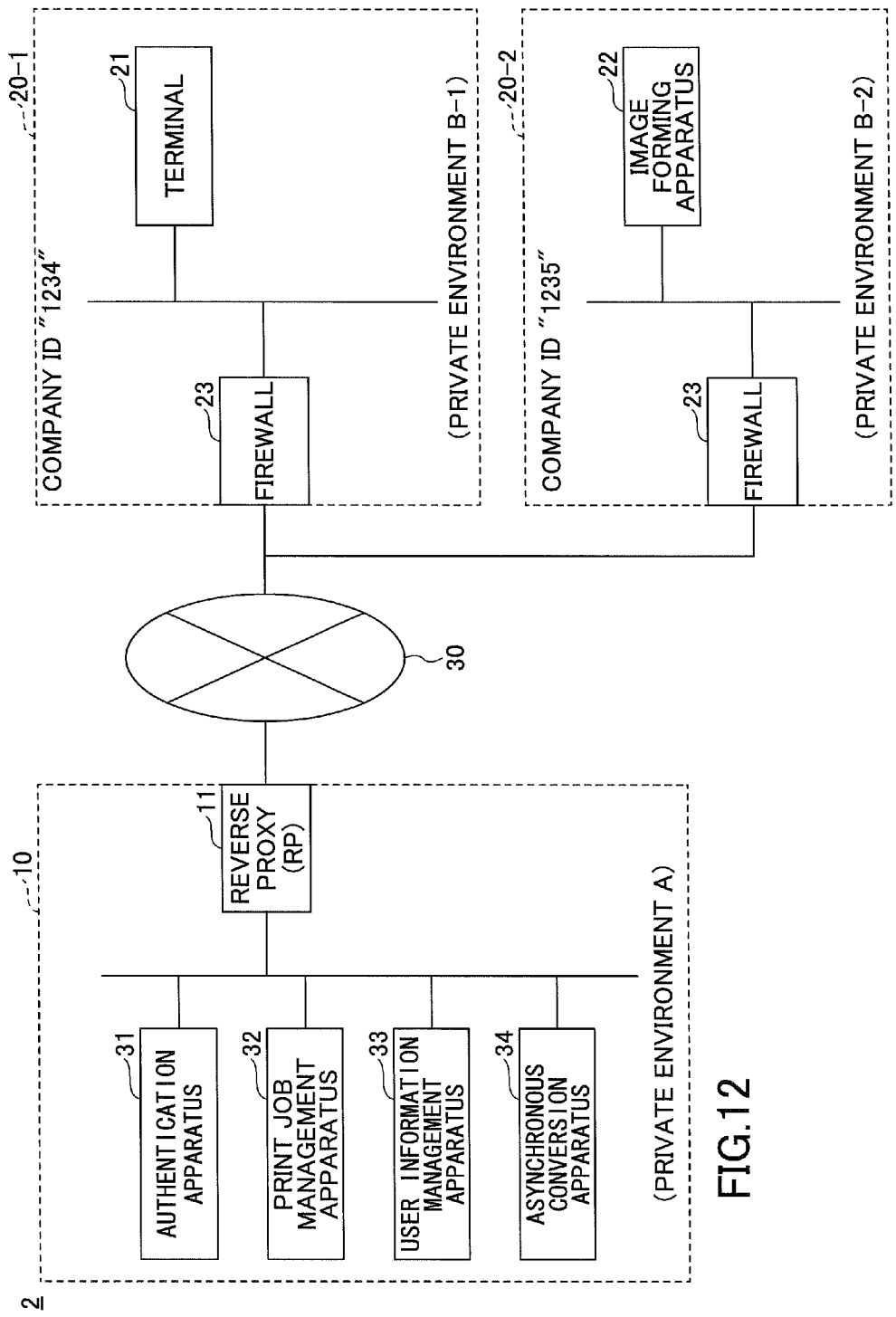
FIG. 12 is a drawing illustrating an exemplary configuration of a printing system according to a second embodiment.

FIG. 12 is a drawing illustrating an exemplary configuration of a printing system 2 according to the second embodiment. In FIG. 12, a network 10 providing a cloud service and networks 20-1 and 20-2, which are, for example, internal networks of companies, are connected to each other via a public network 30 such as the Internet. The network 20-1 (private environment B-1) may include a terminal 21 and a firewall 23. The network 20-2 (private environment B-2) may include an image forming apparatus 22 and a firewall 23.

The printing system 2 of FIG. 12 is similar to the printing system 1 of FIG. 2 except that the terminal 21 and the image forming apparatus 22 are provided separately in the networks 20-1 and 20-2 having different company IDs. Therefore, overlapping descriptions are omitted here.

In the printing system 2, the terminal 21 of the network 20-1 (private environment B-1) and the image forming apparatus 22 of the network 20-2 (private environment B-2) are authenticated by the authentication apparatus 31 of the network 10. As described later in more detail, the authentication apparatus 31 manages company IDs of the same company or the same corporate group by associating them with a corporate group ID.

For example, when authentication of a user operating an image forming apparatus 22 with a company ID "1235" fails, the authentication apparatus 31 determines whether other company IDs are associated with a corporate group ID that is associated with the company ID "1235".

Here, it is assumed that a company ID "1234" is also associated with the corporate group ID associated with the company ID "1235". In this case, the authentication apparatus 31 performs user authentication using the company ID "1234" instead of the company ID "1235". When the user is associated with the corporate ID "1234", the user is successfully authenticated.

Thus, according to the second embodiment, a user can be successfully authenticated and can print a print file even when the company ID (e.g., "1234") of the user is different from the company ID (e.g., "1235") of the image forming apparatus 22 being operated by the user as long as the company IDs are associated with the same corporate group ID.

Processes other than a user authentication process performed in the printing system 2 of the second embodiment are substantially the same as those performed in the printing system 1 of the first embodiment, and their descriptions are omitted here. In the printing system 2, a user can print a print file using an image forming apparatus 22 (or any other device) that is located in a company to which the user belongs or a company in the same corporate group even if the company ID of the image forming apparatus 22 is different from the company ID of the user.

Here, even in the printing system 2, a user is not successfully authenticated if the company ID (e.g., "1234") of the user is different from the company ID (e.g., "1235") of the image forming apparatus 22 being operated by the user and the company ID of the user (e.g., "1234") is not associated with the same corporate group ID that is associated with the company ID (e.g., "1235") of the image forming apparatus 22. Thus, similarly to the first embodiment, the second embodiment also makes it possible to prevent leakage of information to a third party impersonating an authorized user and thereby maintain the security of the printing system 2.

<Processes Performed by Printing System>

Exemplary processes performed by the printing system 2 according to the second embodiment are described below. Below, descriptions of processes in the printing system 2 that are substantially the same as those in the printing system 1 of the first embodiment may be omitted.

<Information Registration Process>

For example, an administrator having administrative rights of the network 20 accesses a uniform resource locator (URL) of the authentication apparatus 31 by using, for example, a browser of the terminal 21 and registers tables as illustrated in FIGS. 13A and 13B.

FIGS. 13A and 13B are exemplary tables registered in the authentication DB according to the second embodiment. The table of FIG. 13A is substantially the same as the table of FIG. 4, and therefore its description is omitted here. The table of FIG. 13B stores company IDs of the same company or companies belonging to the same corporate group in association with a corporate group ID.

In the example of FIG. 13B, company IDs "1234", "1235", and "1236" are associated with a corporate group ID "G01". With the table of FIG. 13B registered in the authentication DB, for example, a user having the company ID "1234" and operating an image forming apparatus 22 with the company ID "1235" can be successfully authenticated.

<Print Job Registration Process and Printing Process>

A print job registration process of the second embodiment is substantially the same as the print job registration process of the first embodiment, and therefore its description is omitted here. A printing process of the second embodiment is different from the printing process of the first embodiment in step S12 (user authentication process) of FIG. 8. Other steps are substantially the same, and their descriptions are omitted here.

Figure 14:
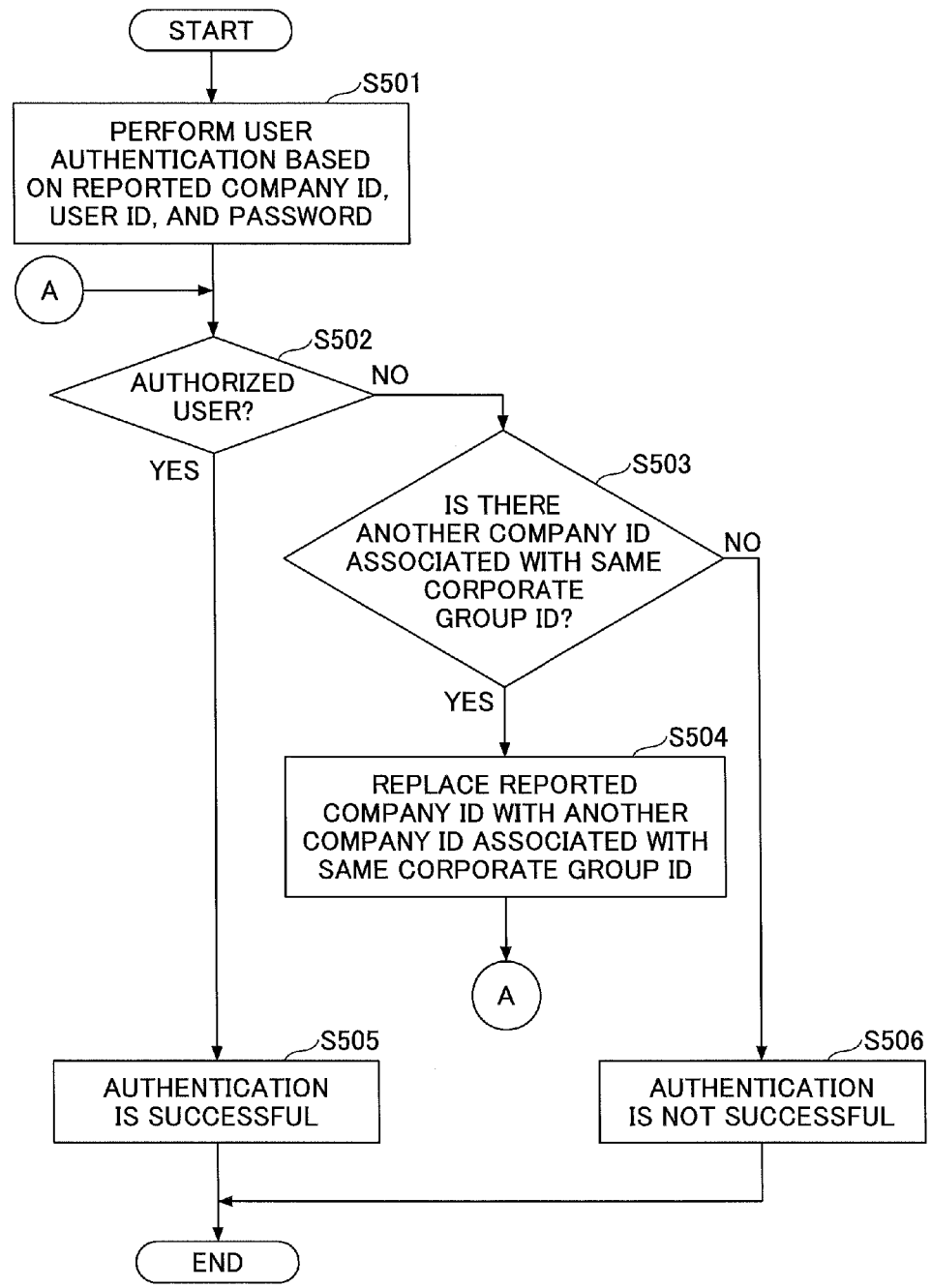
FIG. 14 is a flowchart illustrating an exemplary user authentication process.

FIG. 14 is a flowchart illustrating an exemplary user authentication process. In step S501 of FIG. 14, the authentication apparatus 31 performs authentication of a user by referring to the table of FIG. 13A based on a user ID, a password, and a company ID sent from the image forming apparatus 22.

In step S502, when the combination of the user ID, the password, and the company ID sent from the image forming apparatus 22 is registered in the table of FIG. 13A (or the authentication DB), the authentication apparatus 31 determines that the user is an authorized user. When the user is an authorized user, the authentication apparatus 31 determines, in step S505, that the authentication is successful.

For example, when a user with a company ID "1235" requests authentication from an image forming apparatus 22 with a company ID "1235", the authentication apparatus 31 determines that the user is an authorized user and the authentication is successful.

Meanwhile, when the combination of the user ID, the password, and the company ID sent from the image forming apparatus 22 (in the descriptions below, this company ID may be referred to as a "reported company ID") is not registered in the table of FIG. 13A in step S502, the authentication apparatus 31 proceeds to step S503.

For example, when a user with a company ID "1234" requests authentication from an image forming apparatus 22 with a company ID "1235", the authentication apparatus 31 proceeds to step S503. In step S503, the authentication apparatus 31 refers to the table of FIG. 13B to determine whether a company ID other than the reported company ID is registered in association with a corporate group ID associated with the reported company ID (i.e., whether another company ID is registered in the same record as the reported company ID).

For example, when the reported company ID is "1235" that is associated with the corporate group ID "G01", the authentication apparatus 31 determines that the company ID "1234" is also associated with the corporate group ID "G01". When there is another company ID associated with a corporate group ID that is associated with the reported company ID, the authentication apparatus 31 replaces the reported company ID with the other company ID in step S504 and returns to step S502 to perform user authentication again.

For example, the authentication apparatus 31 replaces the reported company ID "1235" with another company ID "1234" associated with the same corporate group ID "G01" in step S504 and performs user authentication again in step S502. When the company ID of the user is "1234", the user is successfully authenticated.

Step S504 may also be performed in a different manner. For example, when there is another company ID associated with the same corporate group ID as the reported company ID, the authentication apparatus 31 may be allowed to switch to another authentication DB including the other company ID and perform user authentication using the other authentication DB.

If no other company ID associated with the same corporate group ID as the reported company ID is found in step S503, the authentication apparatus 31 determines that the user is not an authorized user and the authentication is not successful. Steps following the user authentication are substantially same as those described with reference to FIG. 8 in the first embodiment, and therefore their descriptions are omitted here.

<Printing Condition Setting>

According to the first embodiment, printing conditions need to be set for respective sections (e.g., sales sections) with different company IDs even when the sections belong to the same company or companies belonging to the same corporate group. For example, when different company IDs are used at Japanese headquarters of a company A and at a US branch of the company A, it is necessary to set printing conditions for a sales section of the Japanese headquarters of the company A and a sales section of the US branch of the company A. The second embodiment makes it possible to share the same printing condition settings by sections with different company IDs.

FIG. 15 is a drawing illustrating exemplary printing condition settings for sections with different company IDs. In FIG. 15, locations of sections and users are omitted.

In the example of FIG. 15, it is assumed that companies with company IDs "1234" and "1235" are associated with the same corporate group ID. Also in FIG. 15, it is assumed that a company with a company ID "1236" is associated with a corporate group ID that is different from the corporate group ID with which the companies with the company IDs "1234" and "1235" are associated.

As illustrated in FIG. 15, sections "sales" of the companies with the company IDs "1234" and "1235" share the same printing condition settings. To share the same printing condition settings, for example, printing conditions for the sections "sales" may be set in association with the corporate group ID.

As an alternative method, the same printing condition settings may be shared by setting printing conditions for a section "sales" of a first company associated with a corporate group and allowing a section "sales" of a second company associated with the same corporate group ID to use the printing conditions set for the first company.

In the example of FIG. 15, printing conditions "duplex printing, full color" are set for the companies with the company IDs "1234" and "1235", and different printing conditions "single-side printing, full color" are set for the company with the company ID "1236". Thus, in FIG. 15, the sections "sales" of the companies with different company IDs are associated with each other (or grouped) to allow the sections "sales" to share the same printing condition settings.

Although the sections "sales" are grouped in FIG. 15, various types of groups may be formed to share the same printing condition settings. For example, users may be grouped by their positions, jobs, locations, and assignments.

<Summary>

In the printing system 2 of the second embodiment, a user can print a print file on an image forming apparatus 22 with a company ID different from the company ID of the user if those company IDs are associated with the same corporate group ID. Thus, the printing system 2 of the second embodiment allows the user to print or process files on devices with different company IDs by associating the company IDs with each other.

For example, even when different company IDs are used at Japanese headquarters of a company A and at a US branch of the company A, a user belonging to the Japanese headquarters can print an uploaded print file by using an image forming apparatus 22 located in the US branch of the company A.

The printing system 2 of the second embodiment also makes it possible to group, for example, companies or sections of a company to allow them to share the same printing condition settings. In this case, the terminal 21 may be configured to send, to the print job management apparatus 32, a company ID (third organization identifier) set in the terminal 21 together with a company ID (first organization identifier) entered by the user, and the print job management apparatus 32 (or the user information management apparatus 33) may be configured to identify attribute information (e.g., a location such as a country or a region, a section, and/or positional information) of the user based also on the company ID set in the terminal 21 and identify printing condition settings based on the identified attribute information.

<<Third Embodiment>>

A third embodiment employs a method or mechanism different from the second embodiment to achieve substantially the same effect. In the third embodiment, the printing system 2 used in the second embodiment is also used and therefore descriptions of the system configuration are omitted.

<Processes Performed by Printing System>

Exemplary processes performed by the printing system 2 according to the third embodiment are described below. Below, descriptions of processes in the printing system 2 of the third embodiment that are substantially the same as those in the printing system 2 of the second embodiment may be omitted.

<Information Registration Process>

An information registration process according to the third embodiment is substantially the same as the information registration process in the first embodiment. That is, in the third embodiment, it is not necessary to register the table of FIG. 13B that stores company IDs of companies belonging to corporate groups in association with the corresponding corporate group IDs.

<Print Job Registration Process and Printing Process>

A print job registration process of the third embodiment is substantially the same as the print job registration process of the first embodiment, and therefore its description is omitted here. A printing process of the third embodiment is different from the printing process of the first embodiment in step S315 of FIG. 9B. Other steps are substantially the same, and their descriptions are omitted here.

In step S315 in the printing process of the third embodiment, the image forming apparatus 22 sends a company ID for device authentication, a company ID for user authentication, a user ID, a password, and a device ID to the authentication service unit 12. Thus, in the third embodiment, different from the first embodiment, two company IDs for device authentication and user authentication are sent from the image forming apparatus 22.

The authentication service unit 12 confirms the validity of the company and the validity (location or presence) of the image forming apparatus 22 (device authentication) based on the company ID for device authentication. The authentication service unit 12 also performs user authentication based on the company ID for user authentication. More specifically, the authentication service unit 12 performs user authentication by referring to the authentication DB of FIG. 4A based on the user ID, the password, and the company ID for user authentication sent from the image forming apparatus 22.

The company ID for user authentication may be entered by the user, for example, on the same screen of the image forming apparatus 22 for entering the user ID and the password. In this case, however, even a user with a company ID that is the same as the company ID of the image forming apparatus 22 may also need to enter the company ID for user authentication on the screen of the image forming apparatus 22 for entering the user ID and password.

In the printing system 2 of the third embodiment, to improve the convenience of the user, a screen for a user with a company ID that is the same as the company ID of the image forming apparatus 22 is provided separately from a screen for a user with a company ID that is different from the company ID of the image forming apparatus 22.

Alternatively, one screen may be shared by a user with a company ID that is the same as the company ID of the image forming apparatus 22 and a user with a company ID that is different from the company ID of the image forming apparatus 22. In this case, whether a user has a company ID that is the same as the company ID of the image forming apparatus 22 is determined based on whether a company ID for user authentication is entered by the user.

Step S316 and subsequent steps are substantially the same as those in the first embodiment, and therefore their descriptions are omitted here.

<Summary>

The printing system 2 of the third embodiment allows a user to print or process a file on an image forming apparatus 22 with a company ID different from the company ID of the user by sending both of the company IDs for device authentication and user authentication from the image forming apparatus 22.

The printing system 2 of the third embodiment also enables a group of, for example, companies or sections of a company to share the same printing condition settings and thereby enables a user belonging to one of the companies or sections to use the printing condition settings.

<<Fourth Embodiment>>

In a fourth embodiment, a mechanism for determining whether a company ID for device authentication and a company ID for user authentication are associated with the same corporate group ID is added to the mechanism of the third embodiment. In the fourth embodiment, the printing system 2 used in the second embodiment is also used and therefore descriptions of the system configuration are omitted.

<Processes Performed by Printing System>

Exemplary processes performed by the printing system 2 according to the fourth embodiment are described below. Below, descriptions of processes in the printing system 2 of the fourth embodiment that are substantially the same as those in the printing system 2 of the third embodiment may be omitted.

<Information Registration Process>

An information registration process according to the fourth embodiment is substantially the same as the information registration process in the second embodiment. That is, in the fourth embodiment, the table of FIG. 13B, which stores company IDs of companies belonging to corporate groups in association with the corresponding corporate group IDs, is registered in the authentication DB.

<Print Job Registration Process and Printing Process>

A print job registration process of the fourth embodiment is substantially the same as the print job registration process of the third embodiment, and therefore its description is omitted here. A printing process of the fourth embodiment is different from the printing process of the third embodiment in the user authentication process performed in step S315 of FIG. 9B. Other steps are substantially the same, and their descriptions are omitted here.

In the printing process of the fourth embodiment, a user authentication process is performed as illustrated in FIG. 16. FIG. 16 is a flowchart illustrating an exemplary user authentication process according to the fourth embodiment.

In step S601 of FIG. 16, the authentication apparatus 31 performs user authentication by referring to the table of FIG. 13A based on a user ID, a password, and a company ID for user authentication sent from the image forming apparatus 22.

In step S602, when the combination of the user ID, the password, and the company ID for user authentication sent from the image forming apparatus 22 is registered in the table of FIG. 13A (or the authentication DB), the authentication apparatus 31 determines that the user is an authorized user. When the user is an authorized user, the authentication apparatus 31 proceeds to step S603.

In step S603, the authentication apparatus 31 determines whether the company ID for user authentication and a company ID for device authentication sent from the image forming apparatus 22 are associated with the same corporate group ID by referring to the table of FIG. 13B.

When the company ID for user authentication and the company ID for device authentication are associated with the same corporate group ID, the authentication apparatus 31 determines, in step S604, that the authentication is successful.

Meanwhile, when it is determined, in step S602, that the combination of the user ID, the password, and the company ID for user authentication sent from the image forming apparatus 22 is not registered in the table of FIG. 13A, the authentication apparatus 31 determines, in step S605, that the user is not an authorized user and the authentication is not successful.

Also, when the company ID for user authentication and the company ID for device authentication are not associated with the same corporate group ID in step S603, the authentication apparatus 31 determines, in step S605, that the user is not an authorized user and the authentication is not successful.

<Summary>

In the printing system 2 of the fourth embodiment, a company ID for device authentication and a company ID for user authentication are sent from the image forming apparatus 22 to the authentication apparatus 31 and the authentication apparatus 31 determines whether the company ID for device authentication and the company ID for user authentication are associated with the same corporate group ID. This configuration improves the security in a case where a user tries to print or process a file on an image forming apparatus 22 with a company ID different from the company ID of the user.

Also in the printing system 2 of the fourth embodiment, when, for example, companies or sections of a company are grouped to share the same printing condition settings as in the third embodiment, a user or the image forming apparatus 22 belonging to a group can preferentially use printing condition settings set for the group.

The present invention is not limited to the specifically disclosed embodiments, and variations and modifications may be made without departing from the scope of the present invention.

In the printing systems 1 and 2 of the above embodiments, the authentication service unit 12, the print job management service unit 13, the user information management service unit 14, and the asynchronous conversion service unit 15 are implemented, respectively, as the authentication apparatus 31, the print job management apparatus 32, the user information management apparatus 33, and the asynchronous conversion apparatus 34, i.e., by separate information processing apparatuses 100. However, the present invention is not limited to the above described configurations.

For example, two or more of the authentication service unit 12, the print job management service unit 13, the user information management service unit 14, and the asynchronous conversion service unit 15 may be implemented by one information processing apparatus 100.

Also in the above embodiments, the image forming apparatus 22 is used as an example of a device. However, the present invention may also be applied to any other device such as a projector or a scanner that inputs and outputs image data. The image forming apparatus 22 may be configured to output (or print) an image on various media in addition to or other than paper.

A company ID may be referred to as an "organization ID", an "organization identifier", or "organization identification information". That is, a company ID (or an organization ID, an organization identifier, or organization identification information) is not limited to identification information for identifying a company, but may also represent identification information for identifying any other type of organization or group. Here, an "organization" is not limited to a company or a university, but may indicate a group of users or devices of any type. Also, a "section" is not limited to a section of a company, but may also indicate a group of users or devices of any type. Further, identification information for identifying a contract for a group of users or devices may be used as a company ID (or an organization ID, an organization identifier, or organization identification information).

In the above embodiments, each of the printing systems 1 and 2 basically includes the terminal 21 for requesting registration of a job, the image forming apparatus 22 for outputting the job, and the information processing apparatus 100 that are connected to each other for communications. The information processing apparatus 100 basically includes a function for converting electronic data (i.e., data to be processed in a job) sent from the terminal 21 into a format (e.g., print data for a printer or display data for a display) that the image forming apparatus 22 (or any other device) can process. The present invention may be applied to, but is not limited to, a system having such a basic configuration.

Company codes/IDs (organization identification information or first/second organization identifiers), user IDs (user identification information or first/second user identifiers), and passwords are registered in advance by a user such as an administrator. For example, an administrator sends company codes, user IDs, and passwords from an administrator terminal to the authentication service unit 12 (or the authentication apparatus 31) to request their registration. A registration unit (not shown) of the authentication service unit 12 registers the company codes, the user IDs, and the passwords in the authentication DB. The registration unit is configured to not register plural sets of the same combination of a user ID and a password in association with one company code.

For example, when receiving a new registration request, the registration unit determines whether a matching combination, which matches the combination of a company code, a user ID, and a password in the new registration request (which may be referred to as a "requested combination"), is present in the already-registered combinations (or records) in the authentication DB. When a matching combination is found in the authentication DB, the registration unit reports it to the administrator terminal without registering the requested combination in the authentication DB. Alternatively, the registration unit may be configured to display a confirmation screen to ask the administrator whether to overwrite the matching combination with the requested combination. When the administrator chooses to overwrite the matching combination, the registration unit overwrites the matching combination with the requested combination.

Meanwhile, when receiving an overwrite registration request, the registration unit determines whether a matching combination that matches the requested combination is present in the already-registered combinations (or records) in the authentication DB. When a matching combination is found, the registration unit overwrites the matching combination with the requested combination. Meanwhile, when no matching combination is found, the registration unit displays a confirmation screen to ask the administrator whether to register the requested combination as a new record or registers the requested combination without displaying the confirmation screen.

In the meantime, the same combination of a user ID and a password may be registered in association with different company codes. For this reason, the registration unit is preferably configured to first identify an already-registered company code that matches a received company code and then determine whether a received combination of a user ID and a password is present in already-registered combinations of user IDs and passwords associated with the identified company code. This configuration makes it possible to more efficiently determine the presence of a matching combination compared with a configuration where the registration unit first identifies already-registered combinations of user IDs and passwords that match the received combination of a user ID and a password and then determines whether the company codes associated with the identified combinations match the received company code.

In the present application, an external apparatus may correspond to the terminal 21; an information processing system may correspond to any one of the printing systems 1 and 2; an electronic data receiving unit may correspond to the print job management apparatus 32; first and second receiving units may correspond to the print job management apparatus 32; first and second authentication units may correspond to the authentication apparatus 31; first through third storage units may correspond to the authentication apparatus 31 and the user information management apparatus 33; and a data conversion unit may correspond to the asynchronous conversion apparatus 34. Also in the present application, an output setting may correspond to a printing condition setting; a data format may correspond to a print file format; attribute information may correspond to one or more of locations (such as a country and a region), a company, a section, a group, an assignment, and positional information; and a first organization identifier may correspond to a company ID entered by the user, second organization identifiers may correspond to company IDs registered in the tables (databases), and a third organization identifier may correspond to a company ID set in the terminal 21.

An aspect of this disclosure provides an information processing system, an information processing apparatus, and a data conversion method that support plural output settings and/or data formats.

What is claimed is:

1. An information processing system implemented by one or more information processing apparatuses, the information processing system comprising:

an electronic data receiving unit configured to receive electronic data via a network from an external apparatus;

a data conversion unit configured to identify a data format corresponding to attribute information of a user operating the external apparatus by referring to a first storage unit storing data formats in association with plural sets of attribute information, and convert the received electronic data into output data according to the identified data format corresponding to the attribute information of the user;

a receiving unit configured to receive a first user identifier and a first organization identifier from the external apparatus; and a first authentication unit configured to perform authentication based on the first user identifier and the first organization identifier by referring to a second storage unit storing one or more second user identifiers in association with second organization identifiers, wherein the first authentication unit is configured to perform the authentication by identifying an organization identifier matching the first organization identifier within the second organization identifiers and identifying a user identifier matching the first user identifier within the second user identifiers associated with the matching organization identifier;

wherein the electronic data receiving unit is configured to receive the electronic data from the external apparatus when the authentication performed by the first authentication unit is successful; and wherein the data conversion unit is configured to identify the attribute information of the user corresponding to the first organization identifier or the first user identifier by referring to a third storage unit storing plural sets of attribute information in association with the second organization identifiers or the second user identifiers, and identify the data format by referring to the first storage unit based on the identified attribute information.

2. The information processing system as claimed in claim 1, wherein the attribute information includes at least one of a country, a region, a section, and positional information.

3. The information processing system as claimed in claim 1, wherein the receiving unit is configured to also receive a third organization identifier from the external apparatus; and wherein the data conversion unit is configured to identify attribute information that is associated with the third organization identifier and matches attribute information corresponding to the first user identifier by referring to a fourth storage unit storing plural sets of attribute information in association with the second organization identifiers and the second user identifiers, identify the data format by referring to the first storage unit based on the identified attribute information, and convert the received electronic data into the output data according to the identified data format.

4. The information processing system as claimed in claim 1, wherein the receiving unit is configured to also receive a third organization identifier from the external apparatus; and wherein the data conversion unit is configured to refer to a fourth storage unit storing the second organization identifiers in association with group identifiers to determine whether the first organization identifier and the third organization identifier are associated with the same group identifier, identify the data format based on the attribute information associated with the third organization identifier when the first organization identifier and the third organization identifier are associated with the same group identifier, and convert the received electronic data into the output data according to the identified data format.

5. The information processing system as claimed in claim 1, wherein the receiving unit is configured to also receive a third organization identifier from the external apparatus; and wherein the data conversion unit is configured to refer to a fourth storage unit storing the second organization identifiers in association with group identifiers to determine whether the first organization identifier and the third organization identifier are associated with the same group identifier, identify the data format based on the attribute information that is associated with the third organization identifier and matches attribute information corresponding to the first user identifier when the first organization identifier and the third organization identifier are associated with the same group identifier, and convert the received electronic data into the output data according to the identified data format.

6. The information processing system as claimed in claim 1, further comprising:

a first storing unit; and a second storing unit, wherein the first storing unit is configured to store the output data or the electronic data in a data storage unit in association with a user identifier of the user; and when the attribute information of the user is changed, the second storing unit stores output data with a data format corresponding to the changed attribute information in the data storage unit.

7. The information processing system as claimed in claim 1, wherein the attribute information indicates a location of the user.

8. The information processing system as claimed in claim 1, wherein the data format indicates a page description language.

9. The information processing system as claimed in claim 1, wherein the attribute information indicates a location of the user, and the data format indicates a page description language.

10. An information processing apparatus connected via a network to an external apparatus, the information processing apparatus comprising:

an electronic data receiving unit configured to receive electronic data from the external apparatus;

a data conversion unit configured to identify a data format corresponding to attribute information of a user operating the external apparatus by referring to a first storage unit storing data formats in association with plural sets of attribute information, and convert the received electronic data into output data according to the identified data format corresponding to the attribute information of the user;

a receiving unit configured to receive a first user identifier and a first organization identifier from the external apparatus; and a first authentication unit configured to perform authentication based on the first user identifier and the first organization identifier by referring to a second storage unit storing one or more second user identifiers in association with second organization identifiers, wherein the first authentication unit is configured to perform the authentication by identifying an organization identifier matching the first organization identifier within the second organization identifiers and identifying a user identifier matching the first user identifier within the second user identifiers associated with the matching organization identifier;

wherein the electronic data receiving unit is configured to receive the electronic data from the external apparatus when the authentication performed by the first authentication unit is successful; and wherein the data conversion unit is configured to identify the attribute information of the user corresponding to the first organization identifier or the first user identifier by referring to a third storage unit storing plural sets of attribute information in association with the second organization identifiers or the second user identifiers, and identify the data format by referring to the first storage unit based on the identified attribute information.

11. The information processing apparatus as claimed in claim 10, wherein the attribute information includes at least one of a country, a region, a section, and positional information.

12. The information processing apparatus as claimed in claim 10, wherein the receiving unit is configured to also receive a third organization identifier from the external apparatus; and wherein the data conversion unit is configured to identify attribute information that is associated with the third organization identifier and matches attribute information corresponding to the first user identifier by referring to a fourth storage unit storing plural sets of attribute information in association with the second organization identifiers and the second user identifiers, identify the data format by referring to the first storage unit based on the identified attribute information, and convert the received electronic data into the output data according to the identified data format.

13. The information processing apparatus as claimed in claim 10, wherein the receiving unit is configured to also receive a third organization identifier from the external apparatus; and wherein the data conversion unit is configured to refer to a fourth storage unit storing the second organization identifiers in association with group identifiers to determine whether the first organization identifier and the third organization identifier are associated with the same group identifier, identify the data format based on the attribute information associated with the third organization identifier when the first organization identifier and the third organization identifier are associated with the same group identifier, and convert the received electronic data into the output data according to the identified data format.

14. The information processing apparatus as claimed in claim 10, wherein the receiving unit is configured to also receive a third organization identifier from the external apparatus; and wherein the data conversion unit is configured to refer to a fourth storage unit storing the second organization identifiers in association with group identifiers to determine whether the first organization identifier and the third organization identifier are associated with the same group identifier, identify the data format based on the attribute information that is associated with the third organization identifier and matches attribute information corresponding to the first user identifier when the first organization identifier and the third organization identifier are associated with the same group identifier, and convert the received electronic data into the output data according to the identified data format.

15. The info nation processing apparatus as claimed in claim 10, further comprising:

a first storing unit; and a second storing unit, wherein the first storing unit is configured to store the output data or the electronic data in a data storage unit in association with a user identifier of the user; and when the attribute information of the user is changed, the second storing unit stores output data with a data format corresponding to the changed attribute information in the data storage unit.

16. The information processing apparatus as claimed in claim 10, wherein the attribute information indicates a location of the user.

17. The information processing apparatus as claimed in claim 10, wherein the data format indicates a page description language.

18. The information processing apparatus as claimed in claim 10, wherein the attribute information indicates a location of the user, and the data format indicates a page description language.

19. A method performed by an information processing system implemented by one or more information processing apparatuses, the method comprising:

receiving electronic data via a network from an external apparatus;

identifying a data format corresponding to attribute information of a user operating the external apparatus by referring to a first storage unit storing data formats in association with plural sets of attribute information;

converting the received electronic data into output data according to the identified data format corresponding to the attribute information of the user;

receiving a first user identifier and a first organization identifier from the external apparatus; and performing authentication based on the first user identifier and the first organization identifier by referring to a second storage unit storing one or more second user identifiers in association with second organization identifiers, wherein the authentication is performed by identifying an organization identifier matching the first organization identifier within the second organization identifiers and identifying a user identifier matching the first user identifier within the second user identifiers associated with the matching organization identifier;

wherein the electronic data is received from the external apparatus when the authentication is successful; and wherein the attribute information of the user corresponding to the first organization identifier or the first user identifier is identified by referring to a third storage unit storing plural sets of attribute information in association with the second organization identifiers or the second user identifiers, and the data format is identified by referring to the first storage unit based on the identified attribute information.

* * * * *